(12) United States Patent
Gomes et al.

(10) Patent No.: US 12,566,707 B2
(45) Date of Patent: Mar. 3, 2026

(54) SYSTEMS AND METHODS FOR CACHE ANALYSIS AND MANAGEMENT

(71) Applicant: Trustees of Tufts College, Medford, MA (US)

(72) Inventors: Cesar Gomes, Medford, MA (US); Maziar Mehdizadehamiraski, Medford, MA (US); Mark Hempstead, Medford, MA (US)

(73) Assignee: Trustees of Tufts College, Medford, MA (US)

( * ) Notice: Subject to any disclaimer, the term of this patent is extended or adjusted under 35 U.S.C. 154(b) by 0 days.

(21) Appl. No.: 18/705,538

(22) PCT Filed: Oct. 28, 2022

(86) PCT No.: PCT/US2022/078911
§ 371 (c)(1),
(2) Date: Apr. 27, 2024

(87) PCT Pub. No.: WO2023/077089
PCT Pub. Date: May 4, 2023

(65) Prior Publication Data
US 2025/0103500 A1      Mar. 27, 2025

Related U.S. Application Data

(60) Provisional application No. 63/263,210, filed on Oct. 28, 2021.

(51) Int. Cl.
*G06F 12/08* (2016.01)
*G06F 12/084* (2016.01)

(52) U.S. Cl.
CPC ................................. *G06F 12/084* (2013.01)

(58) Field of Classification Search
CPC .............. G06F 12/084; G06F 11/3037; G06F 11/3433; G06F 2201/885; G06F 12/0864;
(Continued)

(56) References Cited

U.S. PATENT DOCUMENTS

2008/0244533 A1    10/2008  Berg et al.
2014/0122801 A1*   5/2014  Loh ..................... G06F 11/3433
                                                        711/E12.098
(Continued)

OTHER PUBLICATIONS

Jaleel, Aamer, et al. "High performance cache replacement using re-reference interval prediction (RRIP)." ACM SIGARCH computer architecture news 38.3 (2010): 60-71.
(Continued)

*Primary Examiner* — Masud K Khan
(74) *Attorney, Agent, or Firm* — Quarles & Brady LLP

(57) ABSTRACT

Systems, methods, and media for managing a shared memory cache in a computing system. The management of the shared memory cache can include, for example, determining cache statistics by probabilistically sampling the memory cache: estimating contention of the memory cache based on capturing theft-based contention; and re-partitioning the memory cache based on the cache statistics and the estimated contention. The cache statistics can include thefts and interferences associated with a plurality of cores of the computing system.

20 Claims, 14 Drawing Sheets

(58) Field of Classification Search
CPC ..... G06F 2212/1008; G06F 2212/1024; G06F
12/0846; G06F 12/0857; G06F 2212/502;
G06F 2212/601; G06N 5/01; G06N 20/20
See application file for complete search history.

(56) References Cited

U.S. PATENT DOCUMENTS

2020/0065302 A1    2/2020  Zhou et al.
2020/0358794 A1*  11/2020  Vasseur .................. G06F 16/285
2022/0382661 A1*  12/2022  Everman .................. G06N 3/09

OTHER PUBLICATIONS

Jaleel, Aamer. "Memory characterization of workloads using instrumentation-driven simulation." Web Copy: http://www.glue. umd. edu/ajaleel/workload (2010): 1-12.
Herdrich, Andrew, et al. "Cache QoS: From concept to reality in the Intel® Xeon® processor E5-2600 v3 product family." 2016 IEEE International Symposium on High Performance Computer Architecture (Hpca). IEEE, 2016.
Hilton, Andrew, Neeraj Eswaran, and Amir Roth. "FIESTA: A sample-balanced multi-program workload methodology." Proc. MoBS (2009).
Mukkara, Anurag, Nathan Beckmann, and Daniel Sanchez. "Whirlpool: Improving dynamic cache management with static data classification." ACM SIGARCH Computer Architecture News 44.2 (2016): 113-127.
Wu, Carole-Jean, et al. "SHiP: Signature-based hit predictor for high performance caching." Proceedings of the 44th Annual IEEE/ACM International Symposium on Microarchitecture. 2011.
Pan, Cheng, et al. "Penalty-and locality-aware memory allocation in Redis using enhanced AET." ACM Transactions on Storage (TOS) 17.2 (2021): 1-45.
Sanchez, Daniel, and Christos Kozyrakis. "The ZCache: Decoupling ways and associativity." 2010 43rd Annual IEEE/ACM International Symposium on Microarchitecture. IEEE, 2010.
Sanchez, Daniel, and Christos Kozyrakis. "Vantage: Scalable and efficient fine-grain cache partitioning." Proceedings of the 38th annual international symposium on Computer architecture. 2011.
Liu, Dongsheng, et al. "A low-cost low-power ring oscillator-based truly random No. generator for encryption on smart cards." IEEE Transactions on Circuits and Systems II: Express Briefs 63.6 (2016): 608-612.
Emani, Murali Krishna, Zheng Wang, and Michael FP O'Boyle. "Smart, adaptive mapping of parallelism in the presence of external workload." Proceedings of the 2013 IEEE/ACM International Symposium on Code Generation and Optimization (CGO). IEEE, 2013.
Shen, Fanfan, et al. "Reuse locality aware cache partitioning for last-level cache." Computers & Electrical Engineering 74 (2019): 319-330.
Akpan, Helen Anderson, and B. R. Vadhanam. "A survey on quality of service in cloud computing." International Journal of Computer Trends and Technology 27.1 (2015): 58-63.
Sfiligoi, Igor, et al. "The pilot way to grid resources using glideinWMS." 2009 WRI World congress on computer science and information engineering. vol. 2. IEEE, 2009.
Friedman, Jerome H. "Greedy function approximation: a gradient boosting machine." Annals of statistics (2001): 1189-1232.
Sundararajan, Karthik T., et al. "Cooperative partitioning: Energy-efficient cache partitioning for high-performance CMPs." IEEE International Symposium on High-Performance Comp Architecture. IEEE, 2012.
Koller, Ricardo, Ali José Mashtizadeh, and Raju Rangaswami. "Centaur: Host-side ssd caching for storage performance control." 2015 IEEE International Conference on Autonomic Computing. IEEE, 2015.
Olukotun, Oyekunle Ayinde, Lance Hammond, and James P. Laudon. Chip multiprocessor architecture: techniques to improve throughput and latency. vol. 3. Morgan & Claypool Publishers, 2007.

Sun, Le, Jaipal Singh, and Omar Khadeer Hussain. "Service level agreement (SLA) assurance for cloud services: A survey from a transactional risk perspective." Proceedings of the 10th International Conference on Advances in Mobile Computing & Multimedia. 2012.
Hernando, Leticia, Alexander Mendiburu, and Jose A. Lozano. "Hill-Climbing algorithm: let's go for a walk before finding the optimum." 2018 IEEE Congress on Evolutionary Computation (CEC). IEEE, 2018.
Liu, Zihao, et al. "TriZone: A design of MLC STT-RAM cache for combined performance, energy, and reliability optimizations." IEEE Transactions on Computer-Aided Design of Integrated Circuits and Systems 37.10 (2017): 1985-1998.
Cusumano, Michael. "Cloud computing and SaaS as new computing platforms." Communications of the ACM 53.4 (2010): 27-29.
Hashemi, Milad, et al. "Learning memory access patterns." International Conference on Machine Learning. PMLR, 2018.
Qureshi, Moinuddin K., and Yale N. Patt. "Utility-based cache partitioning: A low-overhead, high-performance, runtime mechanism to partition shared caches." 2006 39th Annual IEEE/ACM International Symposium on Microarchitecture (MICRO'06). IEEE, 2006.
Qureshi, Moinuddin K., et al. "Adaptive insertion policies for high performance caching." ACM SIGARCH Computer Architecture News 35.2 (2007): 381-391.
El-Sayed, Nosayba, et al. "KPart: A hybrid cache partitioning-sharing technique for commodity multicores." 2018 IEEE International Symposium on High Performance Computer Architecture (HPCA). IEEE, 2018.
Beckmann, Nathan, and Daniel Sanchez. "Jigsaw: Scalable software-defined caches." Proceedings of the 22nd international conference on Parallel architectures and compilation techniques. IEEE, 2013.
Tsai, Po-An, Nathan Beckmann, and Daniel Sanchez. "Jenga: Software-defined cache hierarchies." Proceedings of the 44th Annual International Symposium on Computer Architecture. 2017.
Yeh, Po-Shao, et al. "Self-convergent trimming SRAM true random number generation with in-cell storage." IEEE Journal of Solid-State Circuits 54.9 (2019): 2614-2621.
Blahut, Richard. "Hypothesis testing and information theory." IEEE Transactions on Information Theory 20.4 (1974): 405-417.
Jain, Rahul, Preeti Ranjan Panda, and Sreenivas Subramoney. "A coordinated multi-agent reinforcement learning approach to multi-level cache co-partitioning." Design, Automation & Test in Europe Conference & Exhibition (DATE), 2017. IEEE, 2017.
Bitirgen, Ramazan, Engin Ipek, and Jose F. Martinez. "Coordinated management of multiple interacting resources in chip multiprocessors: A machine learning approach." 2008 41st IEEE/ACM International Symposium on Microarchitecture. IEEE, 2008.
Belshe, Rebecca, Peter Schlichting, and Gil Speyer. "Refactoring a statistical package for demanding memory loads: Adapting R for high performance telemetry data analytics." Practice and Experience in Advanced Research Computing. 2020. 444-447.
Wang, Ruisheng, and Lizhong Chen. "Futility scaling: High-associativity cache partitioning." 2014 47th Annual IEEE/ACM International Symposium on Microarchitecture. IEEE, 2014.
Petravick, Don, et al. "The open science grid." Journal of Physics: Conference Series. vol. 78. No. 1. IOP Publishing, 2007.
Khan, Samira Manabi, Yingying Tian, and Daniel A. Jimenez. "Sampling dead block prediction for last-level caches." 2010 43rd Annual IEEE/ACM International Symposium on Microarchitecture. IEEE, 2010.
Ren, Shenyuan, et al. "Contention-aware prediction for performance impact of task co-running in multicore computers." Wireless Networks (2022): 1-8.
Song, Zhenyu et al. "Sushi—a Machine Learning Based Cache Algorithm." Feb. 9, 2019.
Chen, Tianqi, and Carlos Guestrin. "Xgboost: A scalable tree boosting system." Proceedings of the 22nd acm sigkdd international conference on knowledge discovery and data mining. 2016.
Sherwood, Timothy, et al. "Automatically characterizing large scale program behavior." ACM SIGPLAN Notices 37.10 (2002): 45-57.
Carlson, Trevor E., Wim Heirman, and Lieven Eeckhout. "Sniper: Exploring the level of abstraction for scalable and accurate parallel

(56)             References Cited

OTHER PUBLICATIONS multi-core simulation." Proceedings of 2011 International Conference for High Performance Computing, Networking, Storage and Analysis. 2011.

Kiriansky, Vladimir, et al. "DAWG: A defense against cache timing attacks in speculative execution processors." 2018 51st Annual IEEE/ACM International Symposium on Microarchitecture (MICRO). IEEE, 2018.

Hasenplaugh, William, et al. "The gradient-based cache partitioning algorithm." ACM Transactions on Architecture and Code Optimization (TACO) 8.4 (2012): 1-21.

Xiang, Xiaoya, et al. "HOTL: a higher order theory of locality." Proceedings of the eighteenth international conference on Architectural support for programming languages and operating systems. 2013.

Xie, Yuejian, and Gabriel H. Loh. "PIPP: Promotion/insertion pseudo-partitioning of multi-core shared caches." ACM SIGARCH Computer Architecture News 37.3 (2009): 174-183.

Ye, Ying, et al. "Coloris: a dynamic cache partitioning system using page coloring." Proceedings of the 23rd international conference on Parallel architectures and compilation. 2014.

Qu, Yuanzhuo, et al. "Variation-resilient true random No. generators based on multiple STT-MTJs." IEEE Transactions on Nanotechnology 17.6 (2018): 1270-1281.

Shi, Zhan, et al. "Applying deep learning to the cache replacement problem." Proceedings of the 52nd Annual IEEE/ACM International Symposium on Microarchitecture. 2019.

Deng, Zhaoxia, et al. "Memory cocktail therapy: A general learning-based framework to optimize dynamic tradeoffs in nvms." Proceedings of the 50th Annual IEEE/ACM International Symposium on Microarchitecture. 2017.

International Search Report in PCT/US2022/078911; received on Feb. 23, 2023.

* cited by examiner

NOTE: C = CORES; A = ASSOCIATIVITY, R = REPARTITION INTERVAL, ECPU = CPU EVICTED

1400

SYSTEMS AND METHODS FOR CACHE ANALYSIS AND MANAGEMENT

CROSS-REFERENCE TO RELATED APPLICATIONS

The present application is the national stage entry of PCT/US2022/078911 filed Oct. 28, 2022, which is based on, claims priority to U.S. Provisional Application Ser. No. 63/263,210, filed Oct. 28, 2021. The contents of these applications are incorporated by reference herein.

BACKGROUND

In computing, a cache is a high-speed data storage layer which stores a subset of data, typically transient in nature, so that future requests for that data are served up faster than is possible by accessing the data's primary storage location (e.g., off-chip memory). Caching allows users to efficiently reuse previously retrieved or computed data. The ongoing move to chip multiprocessors (CMPs) permits greater sharing of resources (e.g., last-level cache) by processor cores, but this adds pressure to scarce and shared resources.

In computer science, resource contention is a conflict over access to a shared resource such as random-access memory, disk storage, cache memory, internal buses or external network devices. Resolving resource contention problems is one of the basic functions of operating systems. Growing demand for computing suggests contention over scarce resources (e.g., "cache contention") will continue to be a persistent and dominant characteristic of many-core designs.

SUMMARY

The systems and methods provided herein overcome drawbacks associated with resource contention by providing new ways of utilizing cache statistics to predict the best ways to partition the last level cache (LLC).

In some configurations, the present disclosure provides a method of managing a shared memory cache in a computing memory system. The method includes determining cache statistics by probabilistically sampling the memory cache. Additionally, the method includes estimating contention of the memory cache based on capturing theft-based contention. The method further includes re-partitioning the memory cache based on the cache statistics and the estimated contention.

In some configurations, the present disclosure provides a method of training a cache management system. The method includes defining a training data set based on extracted features of a workload. The method further includes providing input feature vectors and corresponding true labels of the training data set to a machine learning model. Additionally, the method includes predicting a desired cache partition configuration via the machine learning model.

In some configurations, the present disclosure provides a system for managing memory cache. The system includes a partitioned memory cache in communication with a plurality of cores. The system further includes a processor including the plurality of cores. The processor is configured to determine cache statistics by probabilistically sampling the partitioned memory cache. The processor is further configured to estimate contention of the partitioned memory cache based on capturing theft-based contention. Additionally, the processor is configured to re-partition the partitioned memory cache among the plurality of cores, based on the cache statistics and the estimated contention.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

BRIEF DESCRIPTIONS OF THE DRAWINGS

DETAILED DESCRIPTION

Figure 1:
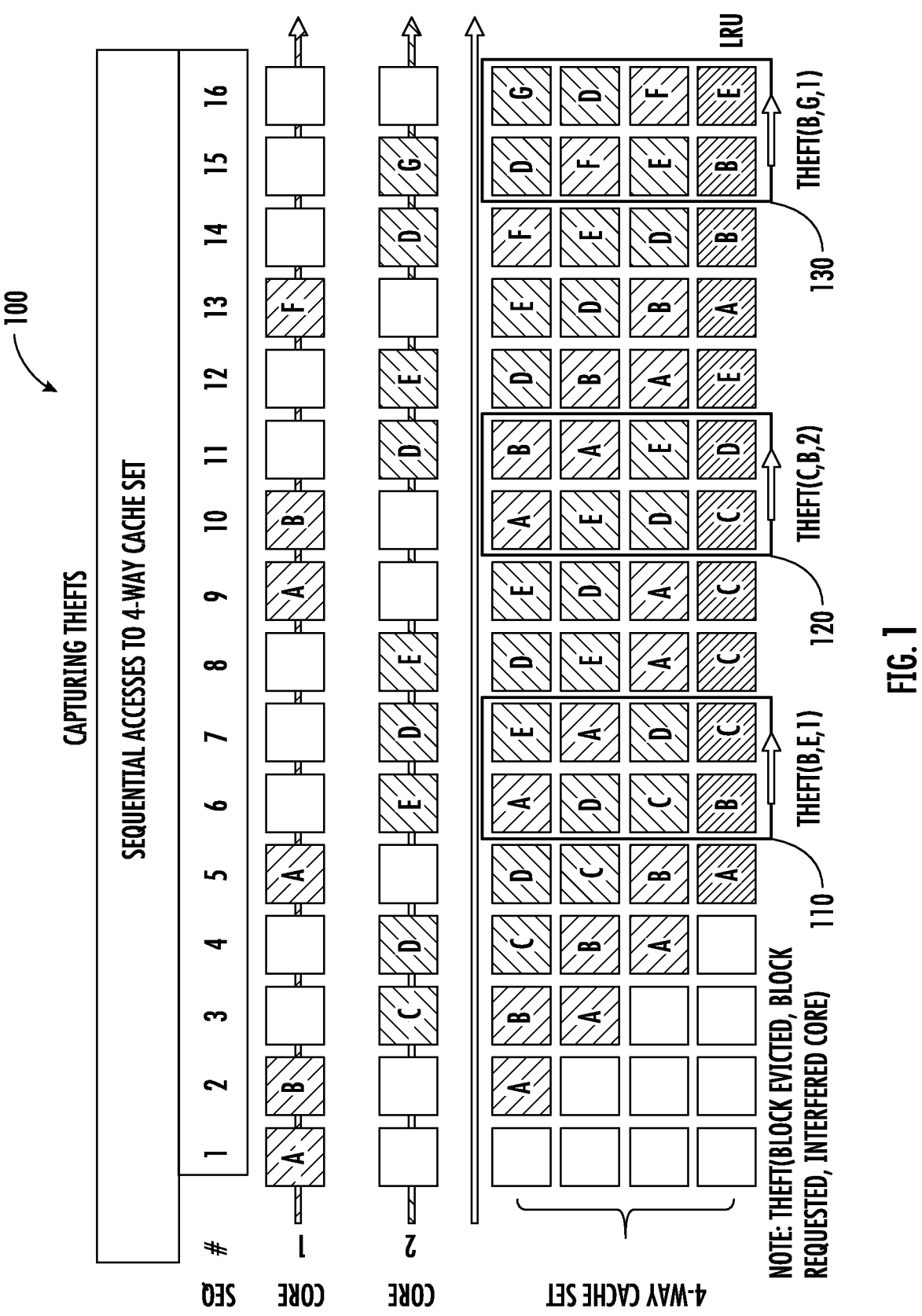
FIG. 1 is a diagram showing an example of thefts associated with a last level cache, in accordance with the present disclosure.

Caching is a method used in processors and in more general SoCs (system on a chip) to minimize the need to go off-chip to read or write memory. Off-chip accesses are relatively slow and utilize a lot of power. If the data is already provided via on-chip memory—a cache—it is preferable to read or write that memory instead. By implementing caching, the frequency of off-chip access can be reduced, speeding up net performance and reducing net power consumption.

It is common to have a hierarchy of caches, where smaller caches are close to a CPU or IP for very fast access, and bigger caches a bit further away (but still on chip) to serve a bigger demand (though not quite as fast). The "last level cache" (LLC) provides caching for the whole chip, and is the last line of defense before going to main memory (off-chip).

The number of cores on a chip continues to increase, which adds pressure to scarce and shared resources like the LLC, which serves a lot of different masters. Though shared resources are constrained by area and power, limitations on hardware do not diminish demand for more computing power. Workloads are also growing in complexity, and virtualization obscures underlying hardware. This creates dissonance between promised and available compute resources. Service Level Agreements (SLA) can mitigate dissonance by promising a quantifiable expected performance as Quality of Service (QOS) to users. However, servers are also becoming more highly utilized, with programmers and administrators squeezing as much performance and throughput as possible from available hardware.

Due to the increasing number of on-chip cores and increasing memory demands of applications, judicious management of cache resources becomes imperative. One approach to managing cache resources is cache partitioning, which involves dividing cache space between applications based on their memory demands (and/or other criteria). However, naively partitioning the cache may lead to performance loss, unfairness, and lack of QoS guarantees. As an example, conventional partitioning methods may use logic or time to isolate per workload cache statistics and make estimates about shared behavior. However, such resources better serve per workload analysis than a holistic understanding of the utilization and effectiveness of caches under the ever-growing contention that comes standard with scaling cores (homogeneous, heterogeneous, and SoC alike).

Modern cache techniques that target contention through different methods (e.g., insertion, eviction, promotion, bypassing, and partitioning algorithms) often track dynamic information via counters or hash tables to build predictions, and rely on cache statistics like hits and misses to capture behavior. As cores and threads scale upward, some techniques specify cache statistic counter overhead unique to each core or thread, going so far as to protect the statistical collection from influence by other cores or threads (e.g., cache occupants). However, in accordance with the present disclosure, there are opportunities to be gained by studying the intra-occupant influence in cache (what is seen as contention), and opportunities to collect important and complementary insight into cache allocation. Accordingly, intelligent techniques may be utilized to realize the full potential of cache management.

Tracking contention in caches with more and more cache occupants offers useful, contextual, and complementary information in designing better and/or lighter re-partitioning logic. However, developing a re-partitioning algorithm from scratch requires time, resources, and a deep understanding of the relationships in the data set.

As will be described in detail herein, aspects of the present disclosure provide: Thefts & Interference: a direct measure of cache contention through inter-core evictions; Agnostic Contention Estimation (ACE): a method of capturing theft-based contention despite partitioning; Probabilistic-ally Sampled Accesses (PSA): a sampling framework built on ACE that allows per access rather than subset sampling, frees cache from added sampling overheads, and enables full cache partitioning (no subset of non-managed cache sets); Gradient-Boosting-Tree (GBT) based re-partitioning: a lightweight, high accuracy learning model trained on contention-aware data set; and a re-partitioning framework that can employ probabilistic sampling, agnostic contention estimation, and an algorithm for scaling a GBT model trained on 2-core data to >2 core workloads. PSA and ACE can be provided independently, where PSA is per access sampling and ACE is theft estimation in the face of mitigations like partitioning. Coupling PSA and ACE can enable per access sampling of thefts despite partitioning.

The present disclosure provides systems for and methods of contention analysis in shared hierarchies with thefts. As will be described, the disclosed systems and methods provide a framework for the development of lightweight and contention-aware re-partitioning algorithms. The re-partitioning algorithms of the present disclosure compare well against an existing re-partitioning algorithm: Utility-based Cache Partitioning. Existing methods often measure contention indirectly (through variations in misses or IPC), or directly (through events that signify a difference between solo and shared cache occupancy). In contrast, the present disclosure implements a theft-based analysis: a measure of cache contention in the form of intra-occupant cache evictions which encode a cache eviction with the context of the interaction between cache occupants.

The present disclosure provides a measure of contention called "thefts," which correlates miss events with interference in shared caches by counting inter-core eviction. As used herein, "thefts" is defined as workload interactions in the last level cache that result in an eviction. Counting thefts can include capturing these workload interactions, which is shown by FIG. 1.

Referring to FIG. 1, a diagram 100 illustrates an example of thefts associated with a last level cache (LLC). Given unique data request streams from two cores, the diagram 100 shows how both cores share a 4-way cache employing the least recently used (LRU) as the eviction policy to choose which block is removed first. As shown, a first theft 110 happens at sequence #6, where core 2 requests data block E, cannot find it in the cache, and needs to evict the LRU block (B) from the set so that E can be written. Further, core 1 inserted block B at #2, so core 2 evicting block B means that core 2 executes a theft of resources from core 1. Similar occurrences are shown at #10 (core 1 executes a theft 120 on core 2) and #15 (core 2 executes a theft 130 on core 1). In this way, the presently disclosed systems and methods can capture a new event with a simple equivalence comparator that is outside of the critical path. Further, the context of interaction means there is also perspective, i.e., looking at the first theft event 110 shows that core 2 executes a theft and core 1 experiences "interference".

As used herein, the execution and experience of thefts are provided as "thefts" and "interference", respectively. In accordance with the present disclosure, thefts can result in misses but not all misses are thefts. Given that thefts are a type of eviction, consideration can be paid to the relationship between misses caused by evictions, or conflict misses.

Figure 2:
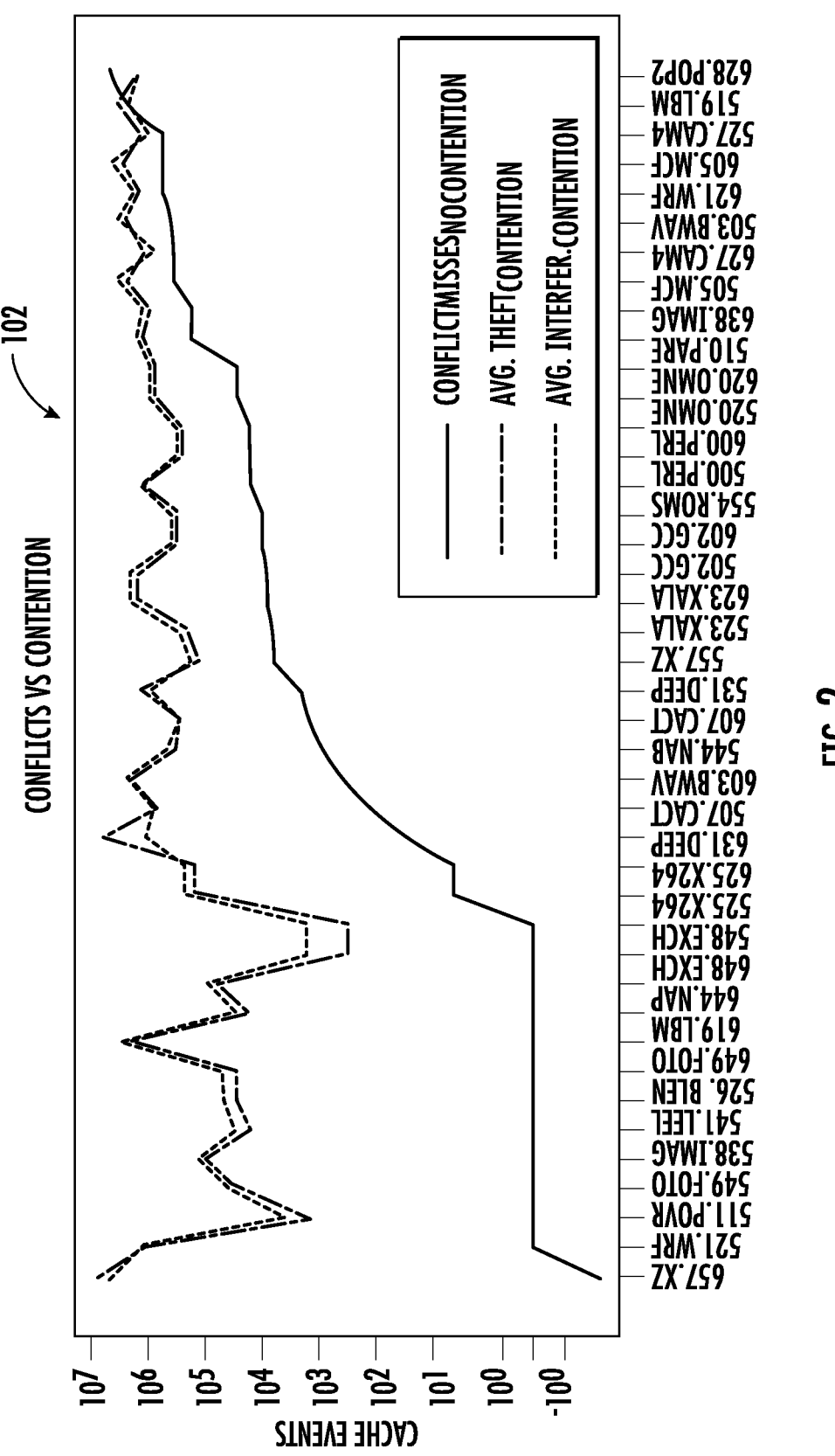
FIG. 2 is a graph showing cache events, in accordance with the present disclosure.

Referring to FIG. 2, a graph 102 shows cache events. In particular, the graph 102 compares conflict misses captured in isolation to cache thefts and interference. In graph 102, the x-axis lists each workload and the y-axis shows the log scale of cache events. Graph 102 shows plots of misses saved by doubling associativity, or conflict misses captured when the workload is run alone, against average thefts and the related interference for each workload when they share cache with another workload. The comparative difference in conflicts and the contention metrics shows the removal of conflicts is not the same as the prevention of cache contention, and thus differentiates thefts from conflicts. The order of magnitude difference between conflict misses when compared to thefts and interference show that contention is not a consequence of a workload not fitting in cache, but of forcing applications to contend in a limited space. Certainly, systems could consider the working set of the mix as one working set and take thefts as conflict misses, but this loses the unique and nuanced behavior of each workload.

Detecting thefts can be achieved via modifications of miss detection logic: adding a core or thread ID comparator, and access type comparator (assuming, for illustrative purposes, that CPU ID indicates physical core ID). Algorithm 1 shown below describes how native contention tracking (NCT) can be employed to detect when evictions of valid cache blocks are thefts:

---

Algorithm 1: Native Contention Tracking (NCT)

---

```
Result: Updates Contention Counters
 1 A = associativity;
 2 eB = cache[S][W];
 3 // eviction candidate C = CPU ID;
 4 // accessing CPU S = set index;
 5 T = access type;
 6 W = way index;
 7 hit = cache hit boolean;
 8 if not hit and eB.valid and not(eB.cpu -- C) then
 9 |    If TI-WRITEBACK then
10 |    |    Thefts[C]++;
11 |    end if
12 |    Interference[eB.cpu]++;
13 end if
```

---

Referring to Algorithm 1: on a miss, the system checks whether the cache block chosen by the eviction policy is valid, and whether the CPU ID of the block and the CPU ID of the accessing CPU are different. If this holds, the system has detected contention and can update counters. Assuming the access type is not a writeback, the system can update the theft counter for the accessing CPU, and the interference counter of the CPU that initially inserted the eviction candidate block. If the access type is a writeback, the system may not update the theft counter: this makes thefts a distinct action taken by the related CPU, not a consequence of the upper-level caches not having the capacity to hold modified data.

Cache statistics are often in use in characterization studies and feature heavily in results coming from simulation environments. Commonly used statistics include cache hits, misses, and evictions, for example. These cache statistics can also be broken down further by access type. Such metrics still contribute great information for analysis, but growing cache hierarchies hide and obscure relationships that statistics like hits and misses are frequently used to determine. For example, computing has reached a point with deep cache hierarchies and scaling cores where misses can mean something dire or simply be a consequence of the application. Misses and other familiar information lack context of the newer shared cache paradigm, and accordingly should be offset with contention information like thefts (in accordance with the present disclosure). In order to demonstrate this, results from conducting Pearson and Spearman statistical significance tests on miss-based heuristics like Miss Rate accesses misses Misses per 1000 Instruction (MPKI), and similarly formulated theft- and interference-based heuristics are provided in Table 1:

TABLE 1

Comparison of Correlation and Statistical Significance

| Metric vs IPC | Pearson R | Pearson P | Spearman R | Spearman P |
|---|---|---|---|---|
| MPKI | −0.29 | 3.94e−27 | −0.37 | 1.05e−42 |
| Misses Accesses | −0.09 | 0.0 | 0.03 | 0.26 |
| TPKI | −0.19 | 2.87e−02 | −0.23 | 5.04e−17 |
| Thefts Misses | 0.48 | 2.09e−76 | −0.24 | 2.50e−18 |
| IPKI | −0.20 | 1.57e−12 | −0.24 | 6.08e−18 |
| Interf. Misses | 0.10 | 0.0 | 0.23 | 8.74e−17 |

Each cache statistic data set is tested against a data-set comprised of the instructions per cycle (IPC) from a common set of 860, different two workload trace experiments. All features are normalized between 0 and 1 per respective features (for example, all thefts are normalized between 0 and 1 according to the maximum and minimum theft across all experiments).

Pearson tests determine the linear correlation, or whether two data sets are linearly independent by computing a correlation coefficient (R) bound between −1 and 1 (0 means little to no correlation) and the P-value which indicates if the result is statistically significant ($P<0.05$ or 0.1 often acceptable). Spearman rank correlation determines if two sets of data can be described by a monotonic function, and has similar implications regarding R- and P-values. While not as strong in all cases, theft- and interference-based metrics have a clear statistical significance (P well below 0.05). In fact, the moderate linear correlation of thefts per miss demonstrates that thefts can complement and be complemented by misses to help characterize potential linear relationships between misses due to contention and performance. Notably, a limitation of informing partitioning algorithms with true thefts, is that this cannot occur while partitioning. The present disclosure addresses this limitation by detecting when partitions prevent thefts, with little additional overhead (0-0.2% of the cache). This detection method, agnostic contention estimation ("ACE"), is described in detail below.

Figure 3:
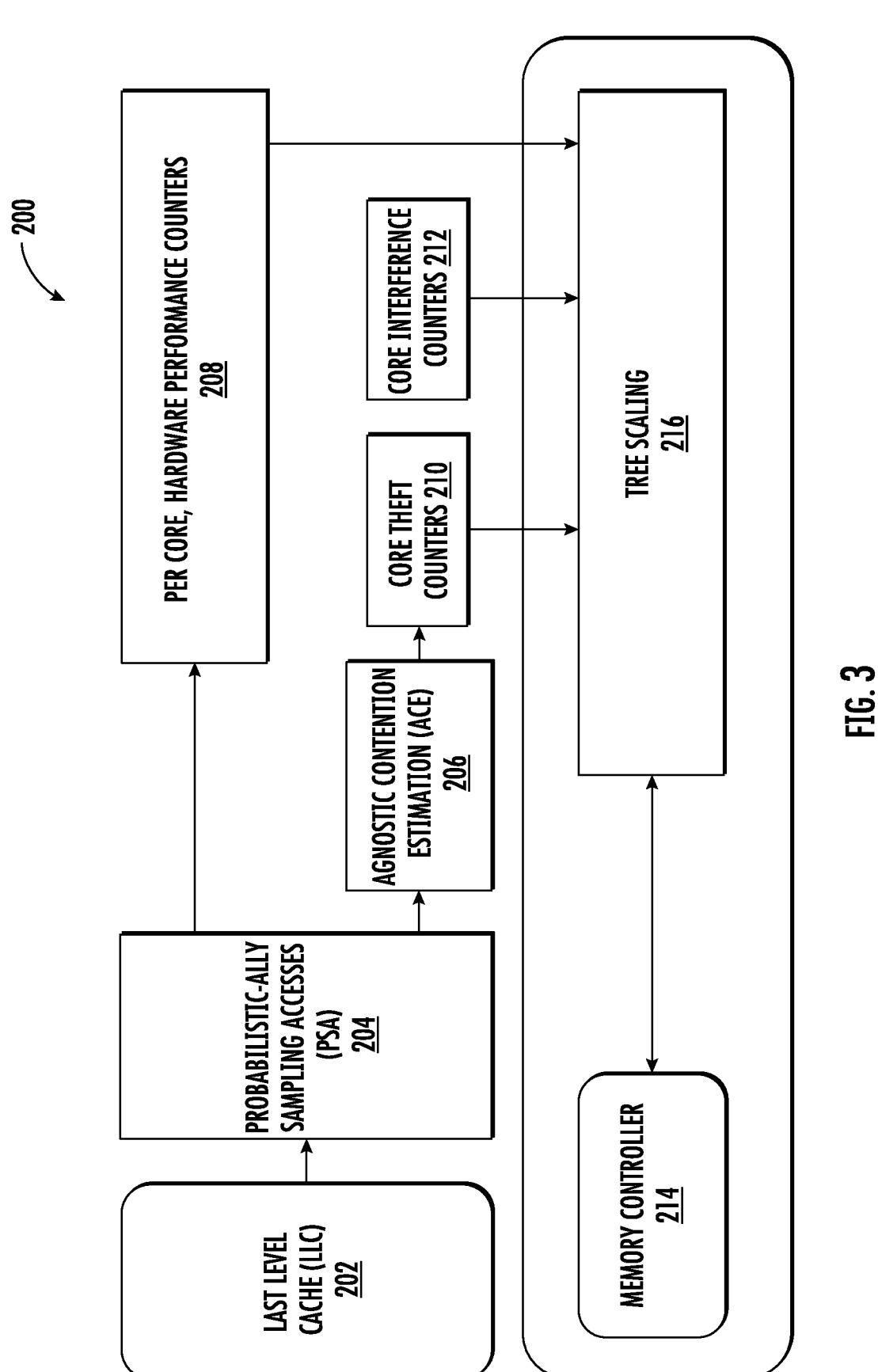
FIG. 3 is a block diagram showing a system for contention analysis and cache partitioning, in accordance with the present disclosure.
Figure 4:
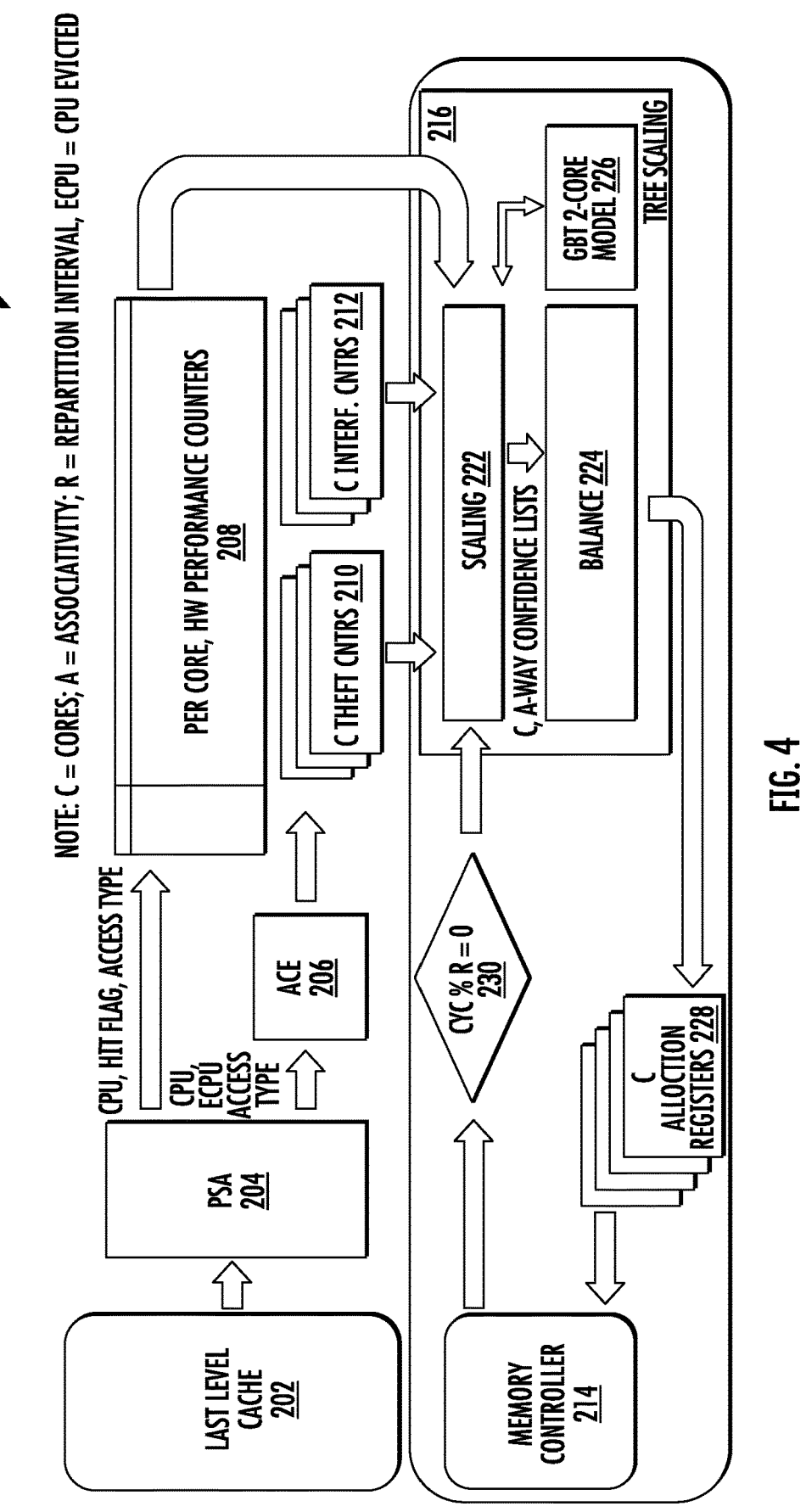
FIG. 4 is a block diagram showing an example system based on the system of FIG. 3, in accordance with the present disclosure.

Referring now to FIGS. 3-4, re-partitioning systems 200, 220 are shown, in accordance with the present disclosure. The re-partitioning system 220 provides an example implementation of the re-partitioning system 200.

As shown, re-partitioning systems 200, 220 can include a last level cache (LLC) 202, which communicates with a probabilistic-ally sampling accesses (PSA) module 204. The PSA module 204 can provide data (e.g., CPU, hit flag, access type) to per core, hardware performance counters ("performance counters") 208, as well as data (e.g., CPU, "eCPU", access type) to an agnostic contention estimation (ACE) module 206. As shown, the ACE module 206 can communicate with core theft counters 210. The core theft counters 210, and the performance counters 208 can provide data to a tree scaling module 216. Performance counters 208 can be implemented as registers that can be used to track events, for example, like cache misses for performance analysis and debug purposes. Additionally, core interference counters 212 can provide data to the tree scaling module 216. Core interference counters 212 can also be implemented as registers, and used track interference. The tree scaling module 216 can communicate (directly or indirectly) with a memory controller 214. Memory controller 214 can control partitioning of one or more caches, such as LLC 202, based on one or more outputs of tree scaling module 216.

Referring specifically to FIG. 4, the tree scaling module 216 is shown to include a scaling module 222, a balance module 224, and a GBT 2-core model 226. The scaling module 222 can receive data from the core theft counters 210, the core interference counters 212, and the performance counters 208. As shown, the scaling module 222 can communicate with the balance module 224 (e.g., cores, associativity-way confidence lists), and the GBT 2-core model 226.

In some configurations, the balance module 224 can communicate with core allocation registers 228, which may communicate with the memory controller 214. Additionally, the memory controller 214 can communicate with a re-partition module 230 (configured to re-partition every R cycles). The re-partition module 230 can further communicate with the scaling module 222.

Aspects of the re-partitioning systems 200, 220 are described in greater detail with reference to FIGS. 5-10. Specifically, aspects of the ACE module 206 are described with reference to FIG. 5, aspects of the PSA module 204 are described with reference to FIG. 6, and aspects of the GBT 2-core model 226 and the tree scaling module 216 are described with reference to FIGS. 7-8.

Thus, FIGS. 3-4 illustrate how ACE, PSA, and GBT come together to form re-partitioning systems 200, 220. PSA and ACE can integrate at the LLC such that PSA determines when LLC-related hardware counters are updated, which includes when ACE checks if an eviction is a theft (and subsequently causes interference). GBT can be generated at the memory controller via an algorithm that takes advantage of the pseudo-oracle prediction list, or configuration confidence list (CC) that GBT outputs to scale the present model to higher core counts. This scaling can be referred to as "tree scaling", which can determine the next partition allocation for 2- and 4-cores (and additional, n-cores).

Present analysis shows thefts and theft-based metrics have a strong correlation to performance comparable and complementary to misses in the Last Level Cache, but allowing such contention is not a favorable choice for designers eager to mitigate it. Cache partitioning, insertion, promotion, and other policies target contention mitigation either directly through physical separation or indirectly through predicting when to leave blocks vulnerable to eviction or bypassing cache altogether. Getting a true measurement for theft-like contention is nearly impossible while such mitigation methods are in place, but the present disclosure provides an estimation framework that can estimate contention despite techniques that prevent it.

Aspects of the present disclosure provide a lightweight method for collecting and sampling cache contention. Agnostic contention estimation (ACE), can provide a framework for estimating so-called "prevented thefts" in a cache that may have partitioning or other cache management policies in place. In some configurations, ACE may be implemented via the ACE module 206 of the re-partitioning systems 200, 220.

ACE takes advantage of the LRU stack to count thefts and interference on cache evictions that result in non-LRU blocks being evicted from LLC. Additionally, the ability to count contention regardless of the cache mitigation method in place affords an opportunity: sampling on a per access basis. Sampler logic can assign specific sets to be sampled from, but leaves open the possibility that not all sets are accessed or provide information. Accordingly, the present disclosure provides the probabilistically sampled accesses (PSA), which takes advantage of ACE to sample on any given access with some probability. Again, PSA and ACE can be provided as separate, independent components.

ACE affords the system the ability to track contention agnostic of the contention-mitigation methods enforced in the cache. Specific to cache partitioning, ACE leverages the LRU stack to determine when a partition prevents eviction of the true LRU when that block is in another partition. An example implementation of ACE is provided as a component of Algorithm 2, shown below.

---

Algorithm 2: PSA + ACE

---

Result: Detects Prevented Theft with some Probability
1 A = associativity;
2 S = set index;
3 W = way index;
4 C = CPU ID;
5 T = access type,
6 B = cache[S][W];
7 hit = cache hit boolean;
8 pT = SampleSetCount/LLCSetCount;
9 if RandomNumberGenerator/RAND_MAX < pT then
10 |   if not hit and not(B.lru==A-1) and B.valid then
11 |   |   if Tl=WRITEBACK then
12 |   |   |   theft[C]++;
13 |   |   end if
14 |   |   interference[B.cpu]++;
15 |   end if
16 end if

---

Per Algorithm 2, the system can test if the current eviction candidate provided by the replacement policy is LRU on a cache miss. If the candidate is not LRU, the system traverses the set until finding either the LRU block, the block with the highest LRU value exclusive of the eviction candidate. To avoid double-counting of prevented contention, the system skips blocks that have the theft bit set (which indicates prevention of an eviction on that block on previous access). If the system finds a block that meets the specified criteria, theft estimates for the CPU inserting a new block and interference estimates for the CPU that inserted the protected block are incremented only if the CPU identifiers do not match.

Figure 5:
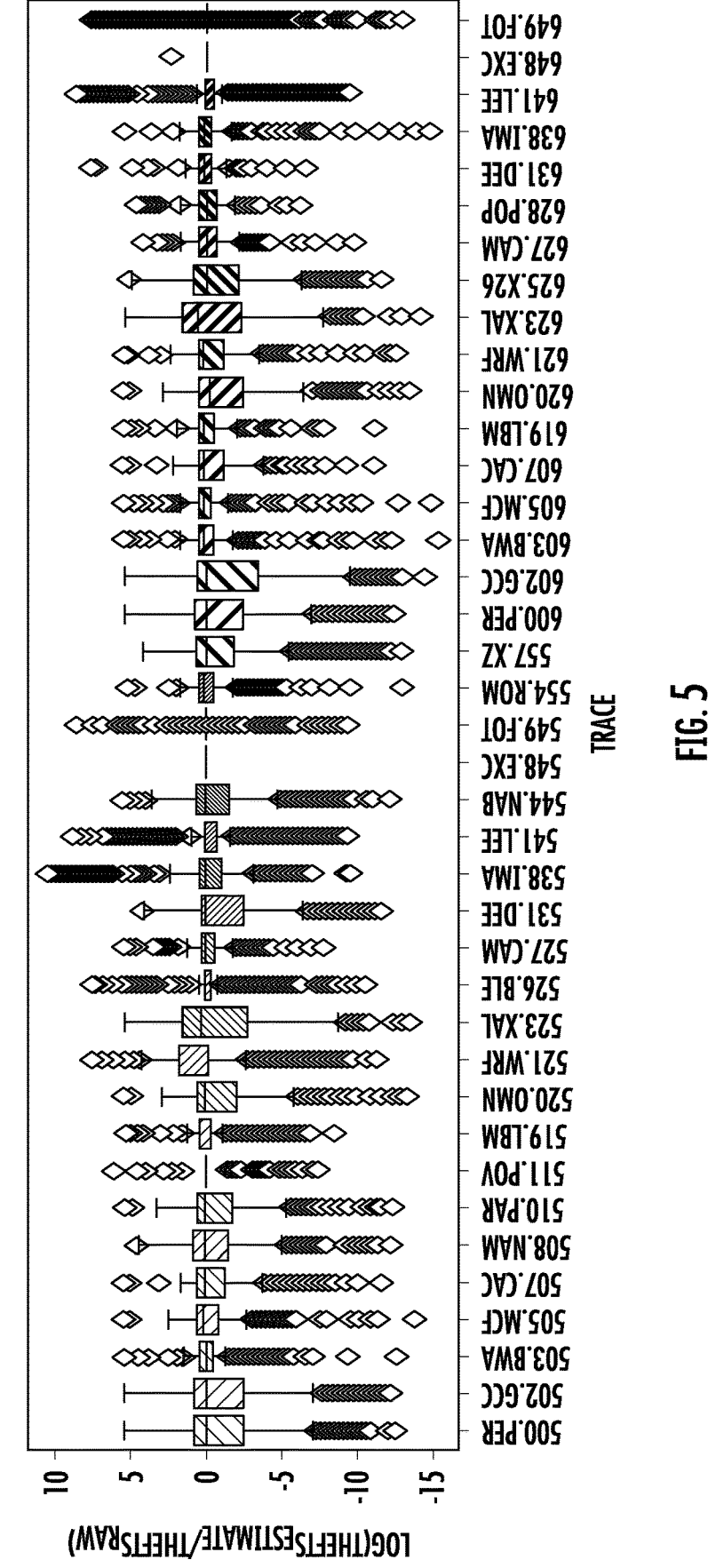
FIG. 5 is a graph showing estimated thefts and captured thefts, in accordance with the present disclosure.

Referring to FIG. 5, a graph 250 shows how the theft estimates (using ACE) compare to thefts captured in an un-partitioned cache. Theft estimates collected in all possible partitioning configurations are normalized to real thefts captured in the unpartitioned cache (which is illustrated on the y-axis of graph 250, where higher than 1 means over-estimation, and lower than 1 means under-estimation). The x-axis of the graph 250 shows the name of the benchmark the traces are derived from. Data is represented as box plots because for each trace there are 15 times 41 different data points from the conducted partitioning studies.

FIG. 5 shows the mean of most box plots is near 1, so the estimates do capture expected behavior. However, the upper and lower bounds are orders of magnitude away from this mean. Such wide ranges of normalized theft estimates speak to capacity sensitivity and utility of partitioning solutions. Finally, a consequence of how ACE estimates contention despite cache partitioning being enforced via LRU is that it enables per access sampling.

Cache set sampling is a common method of collecting cache statistics on certain cache sets that the architect designates at design time, either as an Associative Tag Directory (ATD) which needs additional hardware, or In-Cache Estimation (ICE) which needs a subset of cache not managed like the rest of cache. Existing systems employ these techniques to great effect, but may sample only those accesses that happen in selected sets. Thus, the existing techniques run the risk of misrepresenting workload behavior and can lead to different conclusions about a given workload.

Modern cache sampling logic is built such that the number of cache sets chosen to be sampled implies a ceiling on cache accesses to be sampled. This ceiling can be defined as $$\lceil P\,(\mathrm{Sample})\rceil = \frac{s}{S},$$

where s is the number of cache sets designated for sampling and S is the total number of cache sets. The concern with the sampled access ceiling is that the amount of sampled accesses may never approach it because not every designated set (fixed or randomly selected) may be accessed by any workload. According to the present disclosure, PSA can employ the sampled ceiling as a probability threshold over which no statistical accounting can occur. In some configurations, PSA can be implemented via PSA module 204. Sampler hit rate comparisons demonstrate a PSA sampler more reliably replicates full workload hit rate when compared to ATD and ICE. PSA captures 99% of the full hit rate for SPEC 2017 traces on average while ATD and ICE over-estimate (are optimistic) hit rate by 2.98% and 2% respectively. Table 2 as shown below illustrates this data:

TABLE 2

Sampler Details & Average Sampled Hit Rate (HR)

| Sampler | Sample Accesses | Overhead | $HR_{Sample}/HR_{Full}$ |
|---|---|---|---|
| ICE | To a subset of un-managed cache sets | None | 102 |
| ATD | To a separate associative structure | N*M⁺(tag + LRU + valid bit) | 102.98 |
| PSA | With some probability, P | None | 99 |

Figure 6:
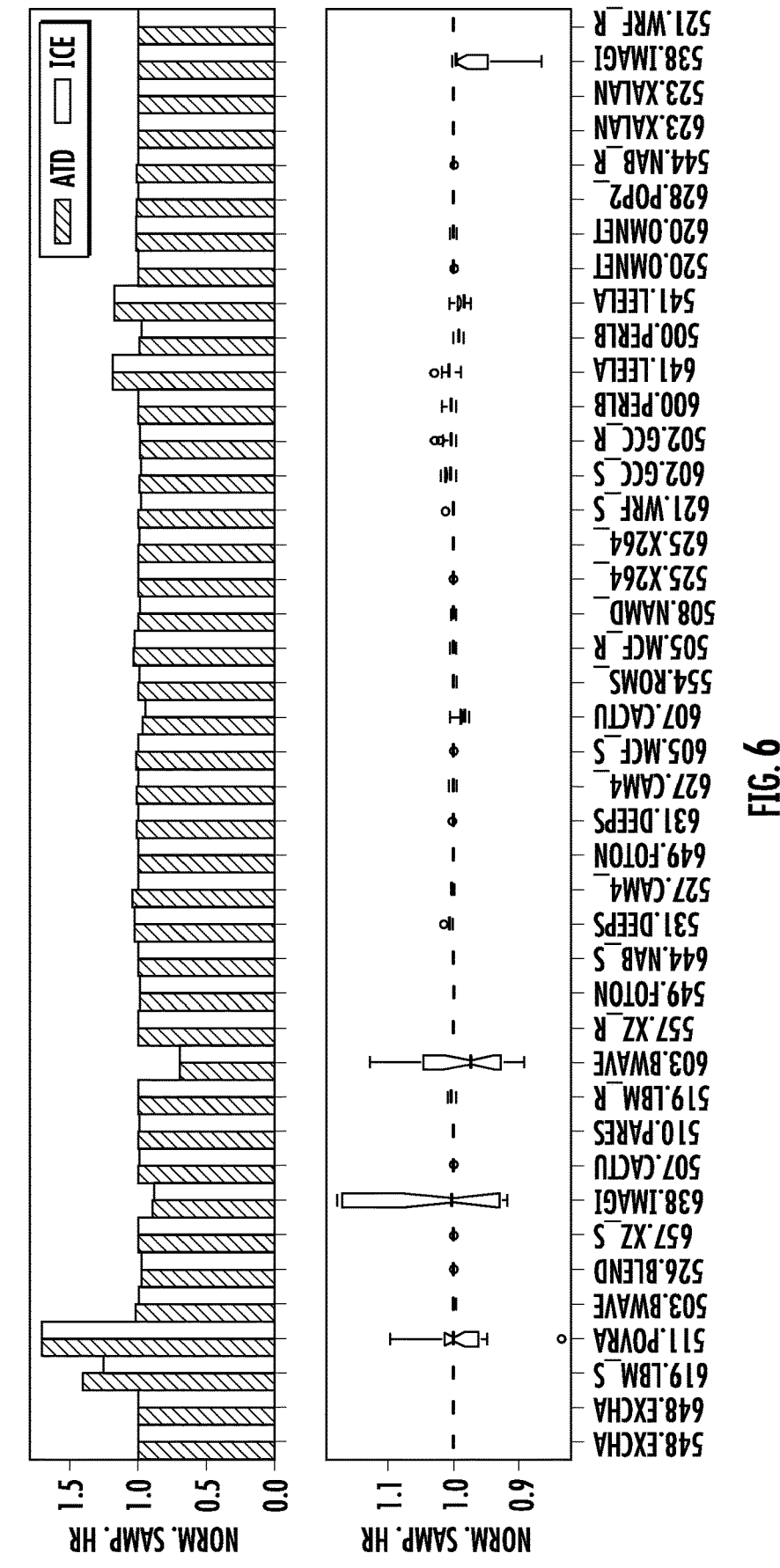
FIG. 6 is a graph showing a comparison of hardware sampling techniques, in accordance with the present disclosure.

Referring to FIG. 6, a graph 260 shows sampled hit rates captured by each of the sampling techniques normalized to full hit rate. The C/C++ random library was used, and seeded with the time at the start of each simulation. ATD and ICE were configured such that the sampler sets are at equal distances away from each other across cache while PSA samples per access with some probability, so 25 iterations of PSA were conducted to cover a range of possible outcomes. While ATD and ICE have some workloads where hit rate is over- or under-estimated, the mean value that PSA reports is often 1, or similar to full hit rate. The instances of wide standard deviation indicates diversity in working sets across those workloads that are not captured in a fixed set solution.

Workloads that ATD and ICE over-estimate are captured fairly accurately by PSA with (619.lbm, 511.povray, 641.leela, 541.leela). 538.imagick indicates a lower bound on the range of hit rates seen across PSA iterations that are far lower than what ATD and ICE represent, and an additional set of workloads (511.povray, 648.imagick, and 603.bwaves) indicate PSA simultaneously over- and under-estimates hit rate. The behavior can be attributed to workloads having multiple working sets with different hit rate behaviors being captured by PSA run with a different time seed. Further, this behavior indicates PSA sensitivity to different behaviors across a workload that lends well to prefetcher training or other dynamic policies hoping to capture distinct behavior.

Regarding overhead, ACE can require a bit to be added per block to enable correct theft and interference accounting, which translates to 8 kB for a 4 MB LLC and scales with cache size. PSA can require logic for a random number generator and comparator logic for the current probability and the sampling threshold imposed. Given that the system is sampling contention on any given miss with some probability due to PSA, the system can simply test if an eviction candidate is LRU and avoid the cost of an additional bit per block. Hardware random number generators can come with a cost, but recent efforts see low power, low area, accurate RNGs that can be included in the system. For comparison, UCP requires 3.7 kB per core for each Associative Tag Structure which scales with core count, while PSA sees no additional memory overhead.

The sampling infrastructure provided herein can make use of modern RNG circuitry that is CMOS-compatible, and probabilistically sample cache accesses, rather than at designated cache segments. Further, implementing gradient boosting tree infrastructure can be based on access to contention (or a proxy) that offers key insight to how workloads live in the space they've been allocated. The multi-label prediction and scaling methods provided herein can use the insight that there are multiple good answers to the partitioning problem.

Machine learning has recently shown promise when applied to system problems. However, the challenge is providing implementations that are lightweight both in the structure of predictor, and feature extraction cost during system run-time. The present disclosure includes the use of a machine learning model, and the concept of thefts, to choose the best partitioning configuration based on features extracted from each core and every level of cache. These features can include: access, hit, miss, miss-rate, and MPKI of different levels of cache hierarchy namely L1D, L1I, L2, and L3; IPC; Thefts, Theft-rate, and TPKI from LLC; and MLP.

The present disclosure includes gradient boosting trees as an implemented machine learning model. In some configurations, the GBTs can be implemented via the GBT 2-core model 226 of the system 220. Decision trees, at the core of GBTs, have many properties that can be beneficial to the systems and methods described. These models: 1) do not require pre-processing such as feature normalization on data, 2) could easily be visualized and analyzed, and 3) can be easily implemented on hardware. In addition, they can solve multi-label problems. However, it is to be understood that other model types may be implemented within the system (e.g., systems 200, 220). To improve decision tree results and to prevent overfitting, ensemble techniques can also be used.

Alternative model types were explicitly considered. First, Multi-Level Perceptrons (MLPs), which are fully-connected neural networks, were tested. However, these models are pretty expensive due to their high number of weight parameters. Next, pure Decision Trees with very low accuracy were implemented, and then Random Forests, which improved on accuracy to some extent. Gradient boosting trees were selected because of their versatility (they do not require normalization of features, it's easy to prevent over-fitting by restricting the depth of trees), low cost, and interpretability (easy to look at nodes and see how decisions are made). The eXtreme Gradient Boosting (XGBoost) library was used to train the models, owing to its substantial optimizations on training performance.

Figure 7:
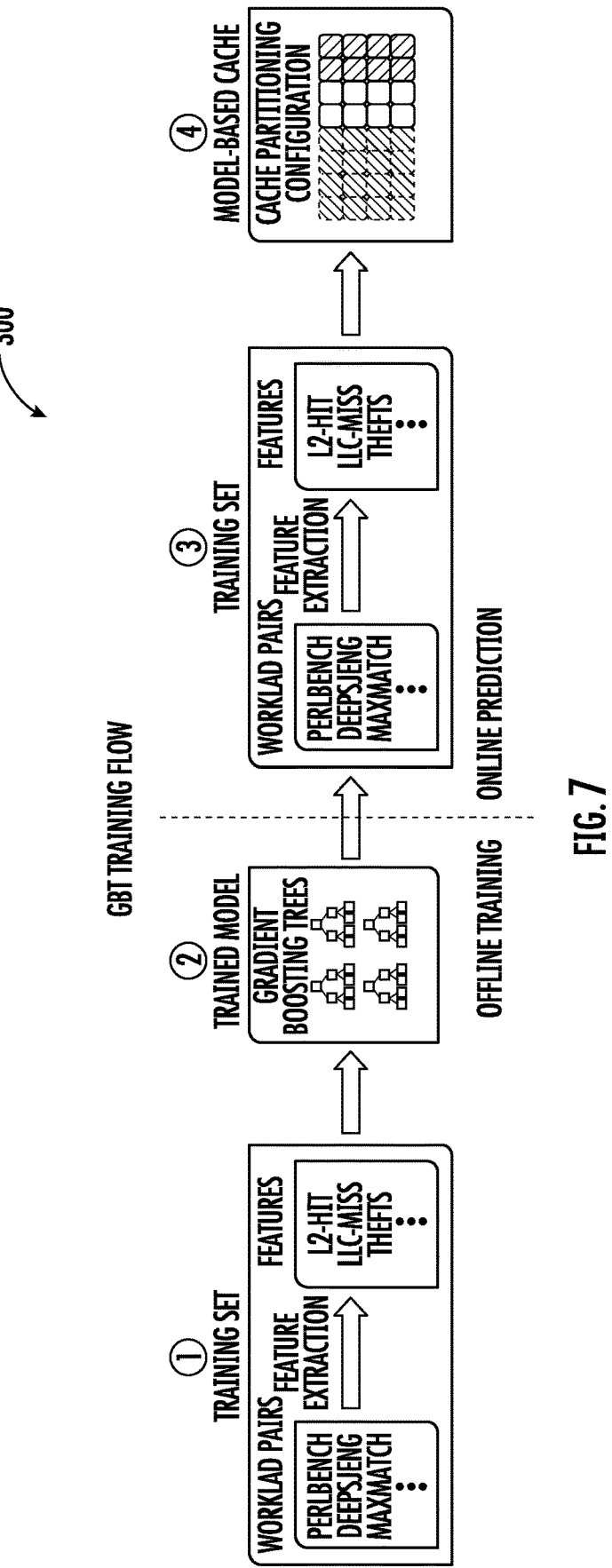
FIG. 7 is a block diagram showing a training method for a gradient boosting trees model, in accordance with the present disclosure.

In gradient boosting, several shallow trees are trained and connected in a serial manner, where the residuals of each tree are fed as input to the next tree. This way each subsequent tree would gradually improve predictions of the previous tree. FIG. 7 shows a GBT training flow 300, in accordance with the present disclosure. To reach an acceptable accuracy, the GBT model was trained on more than 600 different mixes of application pairs. After creating the workload combinations and extracting their features through simulation, a model was trained offline on the feature sets. The trained model was then used on unseen mixes to predict a partition, approximating the oracle configuration.

Figure 8:
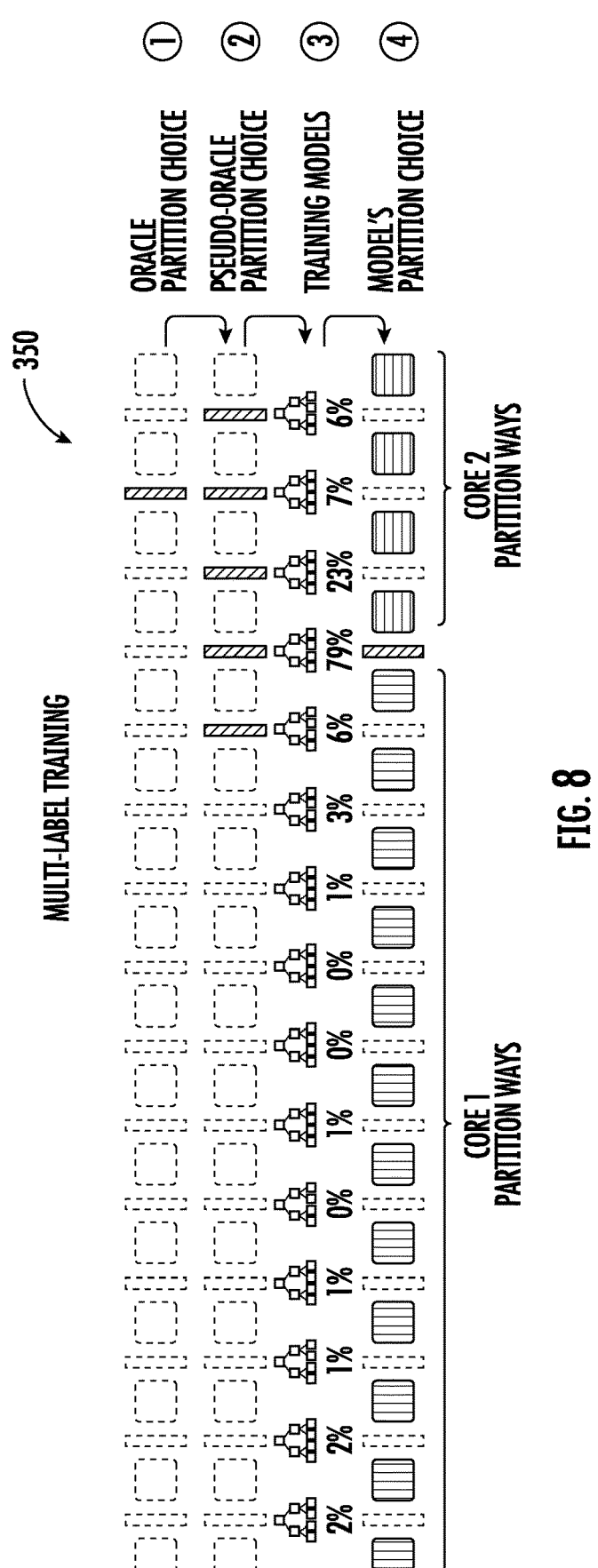
FIG. 8 is a block diagram showing another training method for a gradient boosting trees model, in accordance with the present disclosure.

As shown by FIG. 8, a multi-class multi-label problem can be developed based on training illustration 350. The rationale is as follows: the overall goal of the model is to choose a partitioning configuration to achieve the best IPC. This IPC is the result of the Oracle partitioning configuration that is shown in the first row of illustration 350. The label for this example is (000000000000010). The index of 1 shows where to partition the cache to achieve an IPC close to (e.g., approaching) the optimal IPC. However, by observing the dataset, it was determined that some of the Oracle configuration's neighbors have an IPC that is pretty close to the Oracle. This inspired the placement of a threshold where if the IPC of another partition choice is within 1% of the optimal IPC, then it will also be counted as an acceptable configuration. These pseudo-Oracle partition configurations are shown in the second row of illustration 350. The label for this example is (000000000001111).

Therefore, for each application pair, the system can have one to several partition choices and this will make it a multi-label problem. Suppose there are N ways and one desires to divide it between two cores. A possible configuration is to give 1 way to application one and N−1 ways to application 2. Or two ways to application one and N−2 ways to application two. Increasing the number of ways given to the first application would decrease the number of ways given to the second application and vice versa. The goal is to train a model that, based on features extracted from each core, would tell where to partition the cache to achieve the highest IPC for the system. These models are shown in the third row of illustration 350. As shown, for a cache that has N ways, there are N−1 locations that can partition the cache between two cores (shown by bars in FIG. 8) considering that each core gets at least one way. A GBT can then be trained for each of the N−1 partition choices.

Still referring to FIGS. 7-8, the training can be conducted offline on all the instances of the training set. To train the models using the supervised learning algorithm, input feature vectors and true labels may be needed for each instance. Input features were collected through extensive simulations. Additionally, the label for each GBT would be either 0, meaning that the system should not partition in that specific location, or 1, meaning that the system should partition in that specific location. Using the features and labels, the system can train the models. The result of this stage is a group of trained GBT models.

Next, instances in the test set can be used to receive a prediction on where to divide the cache between cores. The third row of illustration 350 shows the outcome of doing a prediction using GBTs on one of the test set instances. This result comes in the form of the model's confidence on where the optimal position for the partitioning should be. The partition configuration with the highest confidence can be selected, and cache ways can be assigned to cores based on that prediction (fourth row).

Taking into account the choice of problem definition, it is apparent that false positives have much more importance compared to false negatives. Here, false positives show configurations predicted by the model to have optimal IPC while they don't, and false negatives are ones that models predicted not to have optimal IPC while they do. The system is not concerned about false negatives as long as the model produces at least one true positive result. This positive result should be either the optimal partition choice or one of the other partitions (if any) that has an IPC difference of less than 1% from optimal IPC. On the other hand, false positives should be avoided since they could penalize the performance of the system.

One question that remains: how important are the specific features, namely thefts and interference, in describing the present models? To answer this question, an examination of the features' importance for one of the low-cost high-accuracy models was conducted. The result is shown in the top plot in FIG. 9 (plot 400). The x-axis of plot 400 shows a series of important features in the model, and the y-axis of plot 400 shows the location of the partitioning configuration. The darker the cell in plot 400, the more important the feature to select an optimal partitioning located in that location. As can be seen in plot 400, the importance of the said features, thefts and interference, is more pronounced in the middle locations compared to the extremities. This was expected since there is considerably more contention between workload pairs that mutually require larger portions of cache, compared to the pairs that have at least one application satisfied with a small share.

As discussed above, a supervised learning model of gradient boosting trees was trained on the dataset and employed to predict the configuration with the highest system IPC for the cache partitioning. To train the model, features were used that were extracted from different levels of cache including thefts, MPKI, MLP, etc. The problem was defined as a multi-label problem and therefore several correct labels were produced for each pair.

Figure 9:
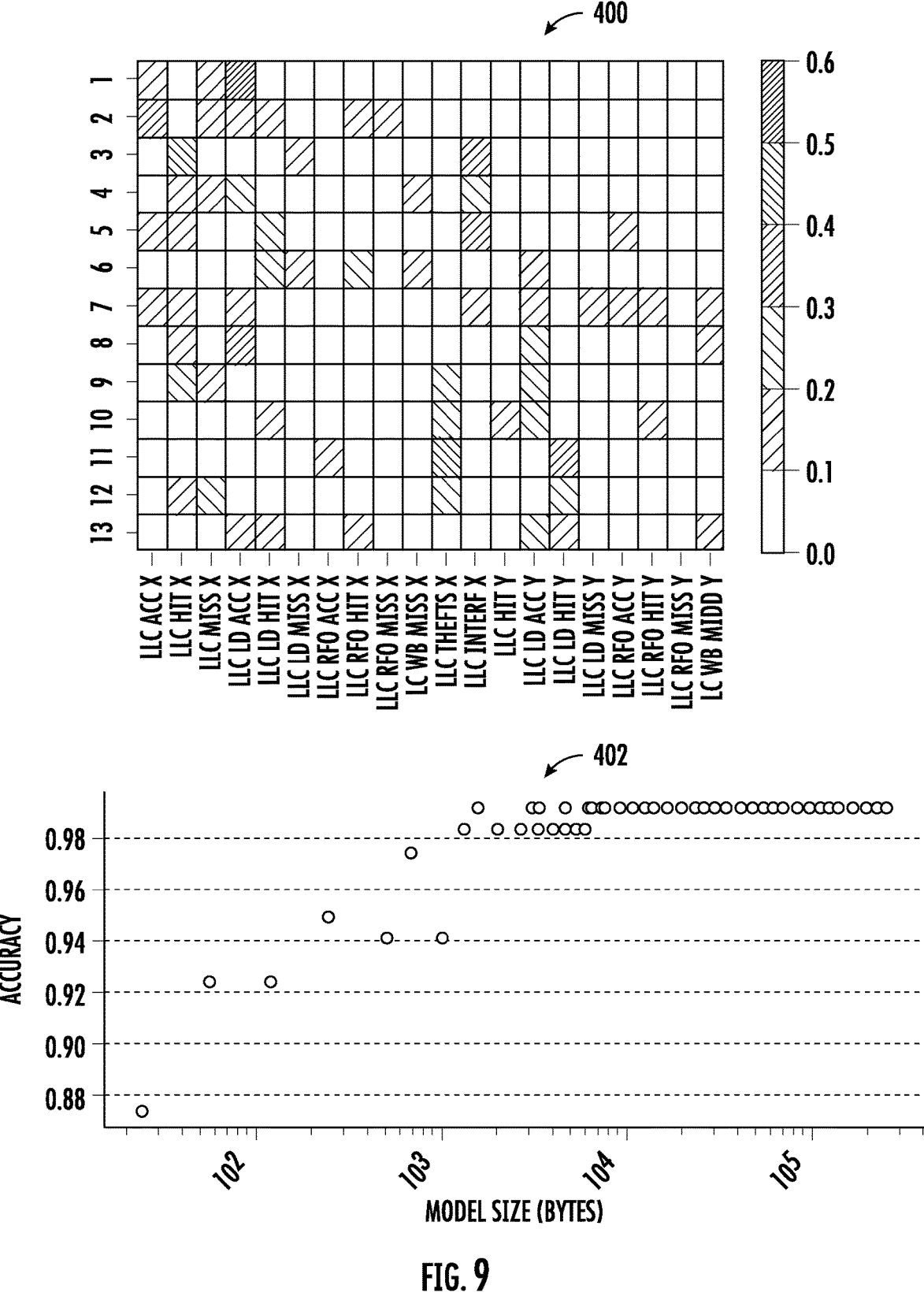
FIG. 9 is a pair of graphs showing feature importance in a low-cost high-accuracy model, in accordance with the present disclosure.

To achieve an acceptable accuracy using the present models, their many hyper-parameters can be tuned. Utilizing XGBoost library, these hyper-parameters include the number of trees, the maximum depth of trees, the learning rate, the sampling ratio of training instances, etc. These hyper-parameters were grid-searched and a 5-fold cross-validation was performed on the training set to attain a good degree of confidence in the accuracy of the models. Plot 402 shown below plot 400 in FIG. 9 shows the cost vs accuracy plot of these models. The x-axis in plot 402 shows the size of the model in bytes, and the y-axis shows the accuracy of the model, predicting one of the correct partitioning configurations. As shown, the smaller models have lower accuracy, but it is not necessary to have the largest models to achieve the highest accuracy. On the contrary, some of the largest models show lower accuracy compared to smaller models. This is due to the over-fitting of the models when the trees get too deep or too many.

The high accuracy of the GBT model at 2-cores motivates interest in a model which can predict for higher core counts, but the effort to generate the data to do so is prohibitive. For example, to find the best configuration for a 4-core mix, 455 different simulations may be needed. Accordingly, the present disclosure provides tree scaling, an algorithmic approach to enable a GBT model which trains on features from 2-core simulation results to be of use at higher core counts (4+ cores). Tree scaling takes advantage of the multi-label confidence output or configuration confidence (CC) list that GBT generates to reason about how to distribute cache allocations on >2 core systems. Tree scaling can have 3 hyper-parameters (T, D, and $s_{max}$) and 2 components: scaling and balancing. In some configurations, the tree scaling can be implemented via the tree scaling module 216 of the systems 200, 220. Additionally, in some configurations, the "scaling" can be implemented via the scaling module 222 of the system 220, and the "balancing" can be implemented via the balancing module 224 of the system 220.

Tree scaling can be designed with three hyper-parameters to control how allocations are distributed: a confidence threshold, T; a threshold decay rate, D; and a provisioning switch event maximum, $s_{max}$. The confidence threshold indicates the confidence level that a configuration in a CC must meet to be selected as a new partition. The threshold decay rate is the amount the system decrements the current threshold in the event it cannot find a solution or it has switched provisioning schemes too often and might have missed a solution.

How often the total allocation becomes successively over- and under-provisioned without finding a balanced solution can be tracked. The number of times this occurs can be compared to a switching threshold, or the number of times tree scaling can switch provisioning schemes before subtracting the decay value from the current threshold. In some configurations, the threshold decay can be set to 0.1, and the switch count max can be set to 4 (i.e., double the number of desired partitions). Other values may be used. $s_{max}$ can be set as equal to the number of cores.

Tree scaling can generate configuration confidence (CC) lists per core by placing each workload as the first input feature set and a combination of features from other workloads as the second input feature set. For example, say one wants to generate a CC for core 0 in a 4-core mix. Recall that GBT takes N features per core (total features=N*core) to predict confidences for each way of dividing cache between 2 workloads and represents this as a (set associativity-1)-element list of confidences bound between 0 and 1 (can be referred to as a CC). Tree scaling takes two steps towards generating the CC for core 0 by creating an (N*2)-element input list to GBT, assigns the N features for core 0 as the first N of the input list, and does an element-wise combination of the N features for all remaining core features. For example, if one has hits, misses, and thefts for each core, the input list looks like the following:

| $hits_0$ | $misses_0$ | $thefts_0$ | $hits_{1:3}$ | $misses_{1:3}$ | $thefts_{1:3}$ |
|---|---|---|---|---|---|

(see, e.g., scaling module 222).

Non-theft features can be combined with a sum, while rates and theft-based features can be combined via a max function. Taking care to combine thefts differently from other features is intentional, given that thefts and interference are a consequence of sharing last level cache, and are therefore dependent on the other workloads that share last level cache. Once complete, there will be a CC per each core that shares cache, and the system can traverse to find the allocation with maximum confidence at the smallest configuration (MaxMin). The resulting output is a list of partition solutions for each core, which can be provided to the balancing module (e.g., balancing module 224).

When the sum of the output from scaling does not equal associativity, one has an over- or under-provisioning of resources. Over-provisioning means that the total best allocations exceed the total cache capacity, and conversely, under-provisioning means that the total best allocations are less than the total cache capacity. Tree scaling handles miss-provisioning in two ways: if under-provisioning, the partition with most to gain from increasing the current allocation can be selected (calculate the average weight of allocations greater than current allocation); and if over-provisioning, the partition with the least to lose from decreasing can be chosen (calculate the average weight of allocations lesser than current allocation).

The most-to-gain can be calculated as the highest average confidence for all configurations greater than the current configurations. For example, in a 2 core system, the max can be computed as: $max(\Sigma_{j=maxmin[i]}^{A}CC[i][j], i \in [0, \ldots, C])$, where A is associativity and C is core count. The least-to-lose can be calculated similarly, except this computation can be done for all configurations less than the current configuration.

There can be two cases where tree scaling can loop infinitely: if the system cannot find a solution; or if the system switches between over- and under-provisioned when searching for a solution. In the event of either case, the system can decrement T by the threshold decay value, D. The no-solution case is caused by the threshold T being so high that the system cannot find a solution that exceeds it, so it must be reduced. The switching case occurs when the system consecutively find solutions but change the state from over- to under-provisioning (and vice versa). The corner case where all have equal to gain or lose is escaped by comparing the average confidence of the whole CC for each core: the system increments the partition with the smallest average confidence, choosing a configuration above a confidence threshold, T; or decrements the partition with the largest average confidence, choosing a configuration above a confidence threshold, T. Consequently, if the sum of the allocations is equal to associativity, the system sets the new allocations. Additionally, the system can enforce a fair distribution of capacity when the minimum best configuration as designated by all CCs is the smallest and all solutions per each CC have equal weight (for example, all weights in the CC=0.90). A list of partition solutions to enforce for the next 5 million cycles (or n cycles) can be provided to the memory controller (e.g., memory controller 214).

Systems 200, 220 can be tuned by sweeping the contention collection method, the sampling rate or probability of sampling on a given access, and the rate that the cache is re-partitioned. The analyzed performance metrics are average system IPC improvement (percentage difference from an un-partitioned LLC), average normalized throughput of the slower application in each mix (the so-called slow-core is the workload that completes warm-up and simulation only once), and slow-core fairness (IPC normalized to IPC observed when the same workload is simulated alone, also referred to as weighted IPC). Further analysis included best to worst case normalized throughput and fairness with percentile 1-99% of each metric. Percentiles indicate values found in a data set that exceed a designated percentage of all values in that set (i.e. P=1% yields a value that is greater than 1% of all values).

Figure 10:
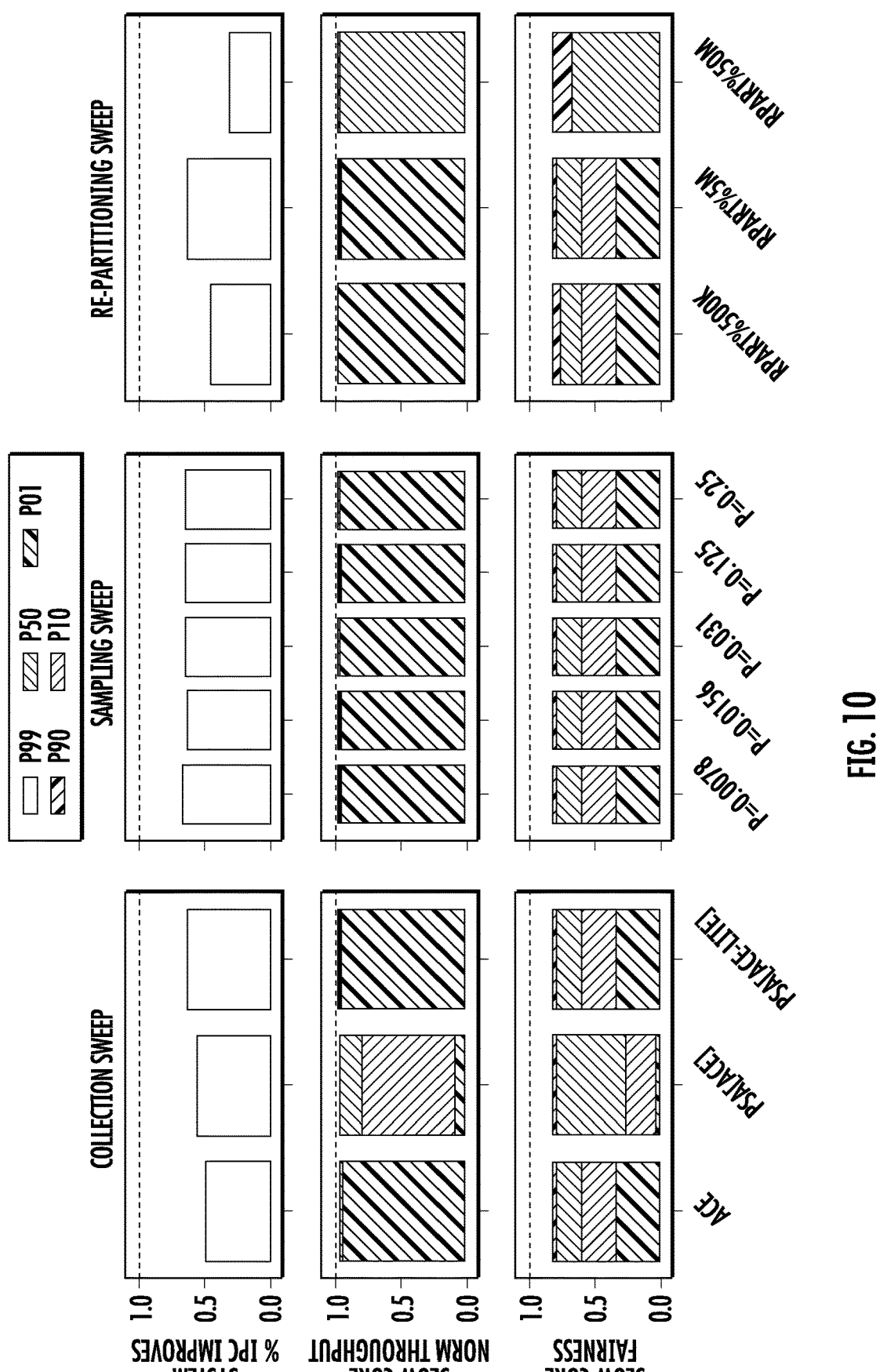
FIG. 10 is a series of graphs showing tuning results of system features, in accordance with the present disclosure.

The results are provided in FIG. 10, which compares different configurations of ACE: the full configuration described with respect to FIGS. 3-5; allowing ACE sampling probabilistic-ally via PSA (PSA [ACE]); and a lightweight or lite variant of PSA [ACE] that does not store bits with each block to maintain theft tracking fidelity (PSA [ACE-lite]). As shown in FIG. 10, PSA [ACE-lite] has the best performance for the system, the slow-core throughput, and slow-core fairness. This result indicates that a statistics accounting framework can be used while having only a nominal impact on added overhead. The raw accounting in ACE may contribute to systems 200, 220 miss-predicting partitioning solutions. Given the theft estimate sensitivity to partition configuration discussed above, it makes sense that PSA [ACE] does slightly better for the system but worse for slow-core throughput and fairness. This result can be attributed to integrating the theft accounting and probabilistic sampling, which PSA [ACE-lite] does away by assuming the infrequency of sampling makes true theft accounting with a theft bit unnecessary. In view of the above, PSA [ACE-lite] can be provided as the default statistics collection mechanism in systems 200, 220.

Sweeping sample probability means changing the fraction of cache desired to sample. The simulated sampling probabilities were 0.78%, 1.56%, 3.1%, 12.5%, and 25%. Results are shown in the center column of FIG. 10. As shown, each configuration is fairly similar, with 0.75% sampling having a slight advantage in the system through-put. The performance improvement can be attributed at a lower sampling rate to PSA. Sampling workload accesses rather than hoping workloads access some designated allows the system to sample access infrequently while achieving a performance advantage. In view of the above, 0.78% can be provided as the default sampling rate in systems 200, 220.

Sweeping the re-partitioning frequency investigates how much time passes between calls to tree-scaling and a new cache-partition allocation is determined. The evaluated set of re-partitioning time quanta includes 500,000 (500K), 5,000,000 (5M), and 50,000,000 (50M) cycles between calls to tree-scaling. It is clear from the right column in FIG. 10 that re-partitioning every 5 million cycles has an advantage over the faster and slower re-partitioning frequencies shown. Accordingly, 5 million cycles may be implemented as the re-partitioning frequency for systems 200, 220.

Gradient boosting trees promises accurate multi-label prediction, and shows high accuracy with just last level cache features. Indeed, the model accuracy is similar across different features sets, and the following key feature sets were tested at run-time: GBT with all features; GBT with features from LLC only; and GBT without theft-based features. A GBT model trained on LLC features alone has a performance advantage (1.007 vs 1.006 when comparing normalized throughput, and 0.99 vs 0.98 when comparing fairness) and suggests core features have a normalizing impact on the partition predictions at run-time. Further, there is a trade-off between the LLC-only GBT model that includes theft-based features and a model that does not include these features. All models are within a few percentage points of performance when comparing the best performing values (percentile 90 and above), but using the GBT model trained on LLC features (including those which are theft-based) does less harm to the worst performing mixes. Accordingly, systems 200, 220 can employ GBT trained only on LLC features with theft-based features.

EXAMPLE EXPERIMENTS

As used herein, the term "CASHT" refers to a re-partitioning system substantially similar to systems 200, 220 as previously described.

ChampSim, which is available via a git repository, was used as a simulation environment. The version of ChampSim used has an 8-core upper bound on the number of cores it supports. ChampSim was modified to allow dynamic re-partitioning and embedded python calls for the GBT model. ChampSim is trace-based, cycle-approximate, and simulates more than one workload trace such that each workload completes a set number of instructions. The Last Level Cache was configured to be 16 way set associative, with cache capacity per core set at 2 MB with 64B blocks. Trace-based simulation can take 2 forms: fixed work where each trace only completes the same amount of work; and variable work where the total number of instructions to simulate is set and each trace runs until this goal is reached. ChampSim follows the fixed work method (where all work-loads complete the same amount of work) by warming cache for the first N instructions and simulating for the next M instructions; however, for cores>1, warm-up and simulation completes when both workloads complete N and M instructions, respectively. If one workload completes before the other, that workload restarts from the beginning of the traces. Due to simulator behavior, performance analysis was focused on the trace per each pair that completes once and identify it as Slow-core or Latency Critical workload throughout the analysis.

The GBT model was built in python as described above. The GBT model was built with data collected through exhaustive simulation of each variation of dividing cache ways between 2 traces, and the 2 traces were selected from a list of unique pairings of the SPEC-17-based traces listed in Table 3 (below). A python interpreter was embedded into the C/C++ based simulation environment to use GBT via tree-scaling at run-time. A trained GBT model was saved offline via the pickle package, and the tree-scaling function loads/unloads the model at each re-partition call in the modified version of ChampSim.

Dynamic CASHT+GBT was compared against Utility-based Cache Partitioning (UCP), a static and even partition allocation (EvenPart, or Even), and a static oracle partition that is composed from exhaustive partition simulations (Static Oracle or S.Orcle). Way-based partitioning similar to Intel Cache Allocation Technology (Intel CAT) was assumed as the partitioning scheme and full Least Recently Used as the replacement policy for all of the techniques. Physical way partitioning has some caveats like so-called block orphaning where a live block could be left out of the partition of the workload that initially requests it once a re-partitioning step occurs.

This issue was not addressed in either CASHT or UCP, but static solutions do not have this problem. There exist numerous partitioning schemes in the literature, but recent works employ partition clustering or are security-minded. Lastly, there are partitioning schemes that were excluded from the comparison the cache architecture (z-cache) does not exist in commodity systems. Lastly, results present in CASHT were generated via the Open Source Grid and the Tufts High Performance Cluster.

The workloads were traces generated by skipping the first 1 billion instructions of each benchmark in SPEC 17 and tracing the following 750 million instructions. The trace characteristics are shown below in Table 3 (LLC intense traces in bold):

TABLE 3

| | SPEC 17 Trace Characteristics | | | | | |
|---|---|---|---|---|---|---|
| Benchmark | Footprint (kB) | LLC APKI | LLC MPKI | $WSS_{Mean}$(kB) | $WSS_{StdDev}$ (kB) | $WSS_{variance}$ (kB) |
| 500.perlbench | 1.024 | 2.095 | 0.639 | 1.393 | 2.062 | 4.252 |
| 502.gcc | 31.488 | 2.214 | 0.785 | 2.891 | 2.203 | 4.853 |
| 503.bwaves | 959.808 | 43.83 | 39.407 | 199.611 | 207.06 | 42873.844 |
| 505.mcf | 6.656 | 32.092 | 12.621 | 18.138 | 20.462 | 418.693 |

TABLE 3-continued

| | | | SPEC 17 Trace Characteristics | | | |
|---|---|---|---|---|---|---|
| Benchmark | Footprint (kB) | LLC APKI | LLC MPKI | $WSS_{Mean}$(kB) | $WSS_{StdDev}$ (kB) | $WSS_{variance}$ (kB) |
| 507.cactuBSSN | 39.104 | 3.176 | 2.075 | 6.508 | 5.454 | 29.746 |
| 508.namd | 182.208 | 2.106 | 0.282 | 3.145 | 20.292 | 411.765 |
| 510.parest | 54.272 | 5.757 | 1.309 | 5.255 | 7.042 | 49.59 |
| 511.povray | 45.888 | 0.006 | 0.003 | 0.046 | 0.582 | 0.339 |
| 519.lbm | 456.960 | 49.558 | 27.646 | 90.965 | 47.702 | 2275.481 |
| 520.omnetpp | 22.592 | 4.589 | 2.852 | 13.406 | 21.221 | 450.331 |
| 521.wrf | 1.024 | 17.823 | 0.042 | 0.357 | 1.078 | 1.162 |
| 523.xalancbmk | 3.584 | 21.343 | 0.192 | 1.273 | 3.979 | 15.832 |
| 525.x264 | 1.536 | 0.274 | 0.047 | 0.272 | 0.333 | 0.111 |
| 526.blender | 56.704 | 0.086 | 0.058 | 0.587 | 1.009 | 1.018 |
| 527.cam4 | 89.2672 | 10.176 | 5.442 | 31.589 | 142.594 | 20333.049 |
| 531.deepsjeng | 0.896 | 0.482 | 0.228 | 0.884 | 0.734 | 0.539 |
| 538.imagick | 11.264 | 3.379 | 0.001 | 0.012 | 0.026 | 0.001 |
| 541 leela | 0.384 | 0.061 | 0.003 | 0.038 | 0.038 | 0.001 |
| 544.nab | 66.368 | 3.965 | 0.18 | 1.107 | 1.923 | 3.698 |
| 548.exchange2 | 0.448 | 0.0 | 0.0 | 0.0 | 0.014 | 0.0 |
| 549.fotonik3d | 9.856 | 0.083 | 0.041 | 0.447 | 0.118 | 0.014 |
| 554.roms | 28.160 | 40.21 | 16.559 | 47.572 | 64.976 | 4221.881 |
| 557.xz | 3.520 | 0.615 | 0.324 | 1.454 | 1.684 | 2.836 |
| 600.perlbench | 1.216 | 2.05 | 0.641 | 1.244 | 1.921 | 3.69 |
| 602.gcc | 1.216 | 2.199 | 0.789 | 2.689 | 2.026 | 4.105 |
| 603.bwaves | 5.504 | 30.624 | 16.863 | 3.594 | 1.959 | 3.838 |
| 605.mcf | 41.728 | 42.554 | 18.716 | 13.35 | 26.1 | 681.21 |
| 607.cactuBSSN | 9.344 | 6.833 | 2.582 | 2.998 | 2.154 | 4.64 |
| 619.lbm | 98.176 | 35.563 | 35.563 | 241.737 | 183.1 | 33525.61 |
| 620.omnetpp | 15.424 | 4.618 | 2.859 | 11.42 | 17.925 | 321.306 |
| 621.wrf | 11.264 | 19.596 | 8.037 | 3.748 | 3.654 | 13.352 |
| 623.xalancbmk | 4.864 | 21.343 | 0.194 | 1.297 | 3.322 | 11.036 |
| 625.x264 | 1.088 | 0.274 | 0.047 | 0.244 | 0.298 | 0.089 |
| 627.cam4 | 1647.808 | 19.193 | 9.317 | 81.221 | 269.089 | 72408.89 |
| 628.pop2 | 36.416 | 109.498 | 23.125 | 158.976 | 423.598 | 179435.266 |
| 631.deepsjeng | 3312.320 | 92.169 | 46.071 | 412.726 | 725.777 | 526752.254 |
| 638.imagick | 78.208 | 5.299 | 3.463 | 1.922 | 0.792 | 0.627 |
| 641.leela | 0.576 | 0.055 | 0.003 | 0.039 | 0.038 | 0.001 |
| 644.nab | 313.856 | 0.184 | 0.092 | 0.828 | 0.147 | 0.022 |
| 648.exchange2 | 0.384 | 0.0 | 0.0 | 0.0 | 0.012 | 0.0 |
| 649.fotonik3d | 31.104 | 0.101 | 0.047 | 0.457 | 0.101 | 0.01 |
| 657.xz | 104.064 | 260.872 | 173.913 | 716.056 | 496.498 | 246510.264 |

Bold names indicate LLC Intense workloads (L2 MPK] > 5 LLC APKI >> 5);
NOTE:
footprint (kB) = (# onique 64B block addresses)/1000; Working set size (WSS) = mean((# unique 64B block addresses per 250k instructions)/1000))

Caches were warmed with the first 500 million instructions and simulated the remaining 250 million instructions of each trace, a method similar to what was done in prior work from Moinuddin K. Qureshi and Yale N. Patt. 2006. Utility-Based Cache Partitioning: A Low-Overhead, High-Performance, Runtime Mechanism to Partition Shared Caches. In Proceedings of the 39th Annual IEEE/ACM International Symposium on Microarchitecture (MICRO 39). IEEE Computer Society, Washington, DC, USA, 423-432, Ruisheng Wang and Lizhong Chen. 2014. Futility scaling: High-associativity cache partitioning. In Proceedings of the 47th Annual IEEE/ACM International Symposium on Microarchitecture. IEEE Computer Society, 356-367, and Yuejian Xie and Gabriel H. Loh. 2009. PIPP: Promotion/Insertion Pseudo-Partitioning of Multi-Core Shared Caches. In Proceedings of the 36th Annual International Symposium on Computer Architecture (Austin, TX, USA) (ISCA '09). Association for Computing Machinery, New York, NY, USA, 174-183, each of which is incorporated herein by reference in its entirety.

Traces were often generated by choosing representative regions, but the reasons for using representative regions are expedient characterizations of benchmarks and confidence that key parts of a trusted workload are being used to exercise the architecture. This work was not a characterization of SPEC 2017, nor did this indicate that the traces were representative of SPEC 17 benchmarks. These traces were important to exercise the caches and DRAM enough to produce diverse behavior across the mixes, and the amount of experiments derived from all unique pairings of traces provides such variety. Finally, mix generation was exhaustive for the 2 core simulations (totaling 860 mixes), while the 4 and 8 core mixes were randomly generated with guarantee of at least 1 LLC intense workload per mix. In the end, 106 4-core mixes and 45 8-core mixes were used.

Metrics to evaluate performance for partitioning techniques were normalized throughput and fairness. Normalized throughput as $IPC_{configuration}/IPC_{LRU}$, where results greater than 1 indicates an improvement in throughput while those less than 1 indicates performance loss. Fairness can be represented as weighted IPC, or $IPC_{c,configuration}/IPC_{iso}$ where c indicates a workload in a C-workload mix (C>1) and iso indicates IPC for workload c when run alone. Fairness is often referred to as weighted IPC.

CASHT was studied in 2, 4, and 8-core configurations. In the 2-core analysis, CASHT was compared to UCP and two static partitioning solutions: Even or EvenPart which is a naive, equal partitioning solution; and Static Oracle or S.Oracle, which was chosen manually by inspecting all 2-core partitioning configurations and choosing the configuration that maximizes system throughput. Static policies provided a known floor and ceiling to partitioning performance that were used to consider the re-partitioning solutions within, and having the static oracle simultaneously allowed the ability to understand how far the CASHT strays from those solutions. In the 4 and 8-core analysis, CASHT and UCP were compared to illustrate how well the tree-scaling algorithm enabled CASHT to approach UCP performance with a fraction of the overhead. For performance analysis, the normalized throughput and fairness metrics described above where used.

Figure 11:
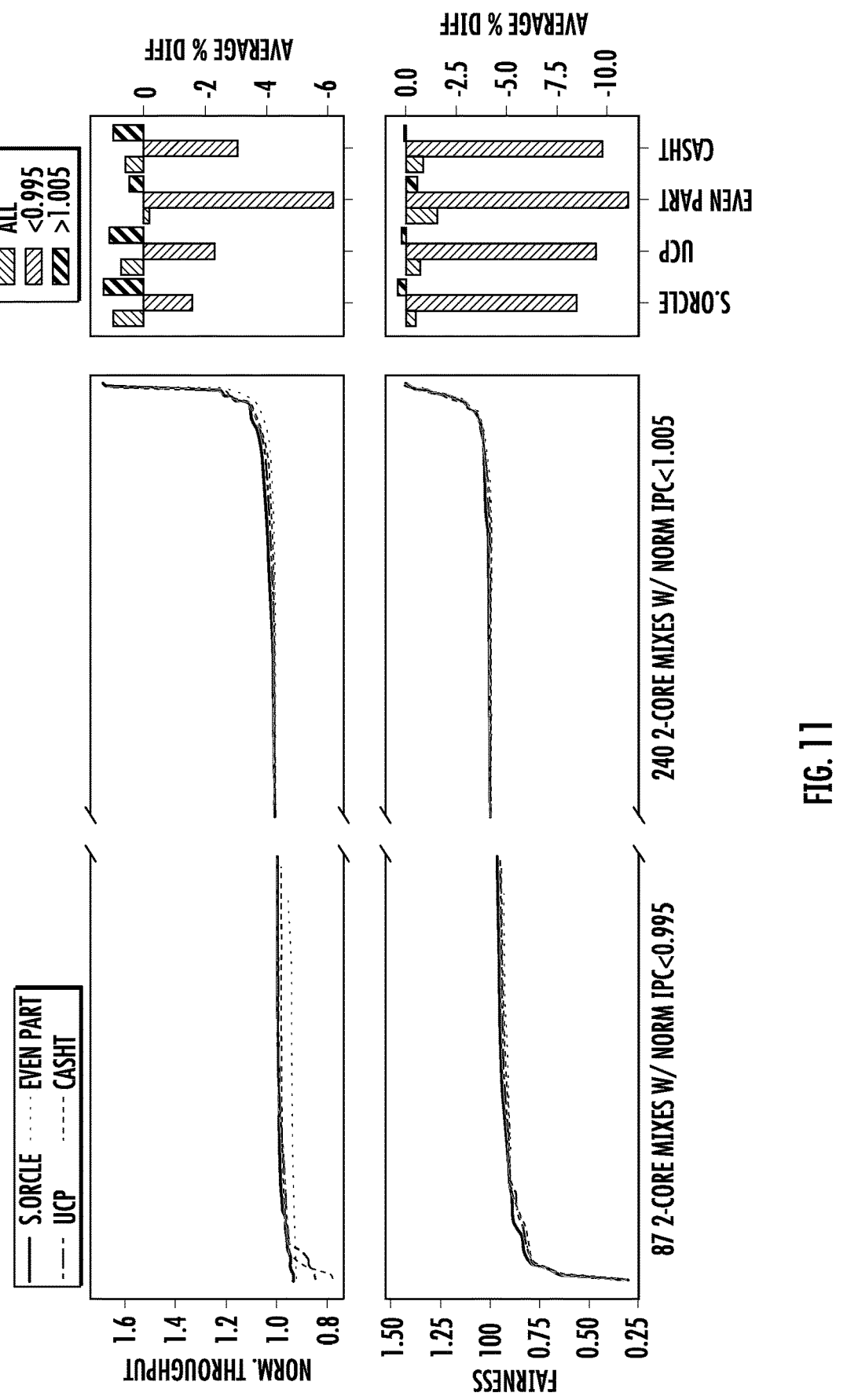
FIG. 11 is a series of graphs comparing experimental results, in accordance with the present disclosure.

S-curves were compared for Static Oracle, UCP, Even Partitioning, and CASHT in FIG. 11. S-curves (performance metric sorted from smallest to largest normalized throughput) were plotted, as were the average of those results for all trace in each of the 860 trace pairs. Because it is difficult to see all 860 results in an S-curve, the curves were broken to zoom into the interesting ends: the throughput results where the static oracle loses at least 0.5% from the unpartitioned case (or normalized IPC<0.995; totals 87 data points); and the throughput results where the static oracle gains at least 0.5% over the unpartitioned case (or normalized throughput>1.005; totals 240 data points). The top row shows normalized throughput for the traces and the bottom row shows fairness for the traces. In summary, CASHT averaged 0.57% improvement in throughput and did no more than 1.8% harm to average single trace performance (i.e. averages 0.982% for fairness). While CASHT did not achieve the 1% average improvement in Latency Critical Trace throughput that the Static Oracle achieves, CASHT was within the margin of error of UCP performance at ⅛th the overhead in the 2 core configuration.

CASHT improved throughput over LRU by 0.57% on average across 860 2-trace experiments, improved as much as 60% in the best case, and harmed throughput well within a noise margin of LRU in the worst case. By comparison, UCP had similar wide extremes within the data that comprise the average throughput improvement over LRU, achieving a max 75% improvement in the best case and a −20% in the worst case. It is clear that CASHT had comparable performance and behavior to UCP due to the similarity in performance across the range of 2-core simulations. Notably, CASHT-full (CASHT with GBT trained on the full cache hierarchy) can exceed the oracle in the absolute worst case range (furthest left), but requires core cache information to do so. Further versions of CASHT that were not tested in this non-limiting experiment take advantage of core hints, rather than full core cache statistics to minimize cost.

Similar to the throughput analysis, the fairness S-curves and average percentage change in fairness of each configuration were studied. Weighted IPC was used as a proxy for fairness, or a measure of how much impact (positively or negatively) sharing cache had on the performance of a trace when run alone (or single-trace IPC). CASHT achieved a fairness of 0.982 on average which translated to a −1.8% loss in IPC versus single trace IPC, had a worst-case fairness of 0.25 which translated to a 75% loss, and best case weighted IPC of 1.48 which translated to 48% gain in IPC. UCP had similar high marks in fairness but did better in the worst case which translates to an average weighted IPC of 0.996 or −0.6% loss in IPC versus single trace IPC. The Even and Static Oracle partitioning solutions frame the dynamic policies at the bottom and top of average performance, respectively.

Figure 12:
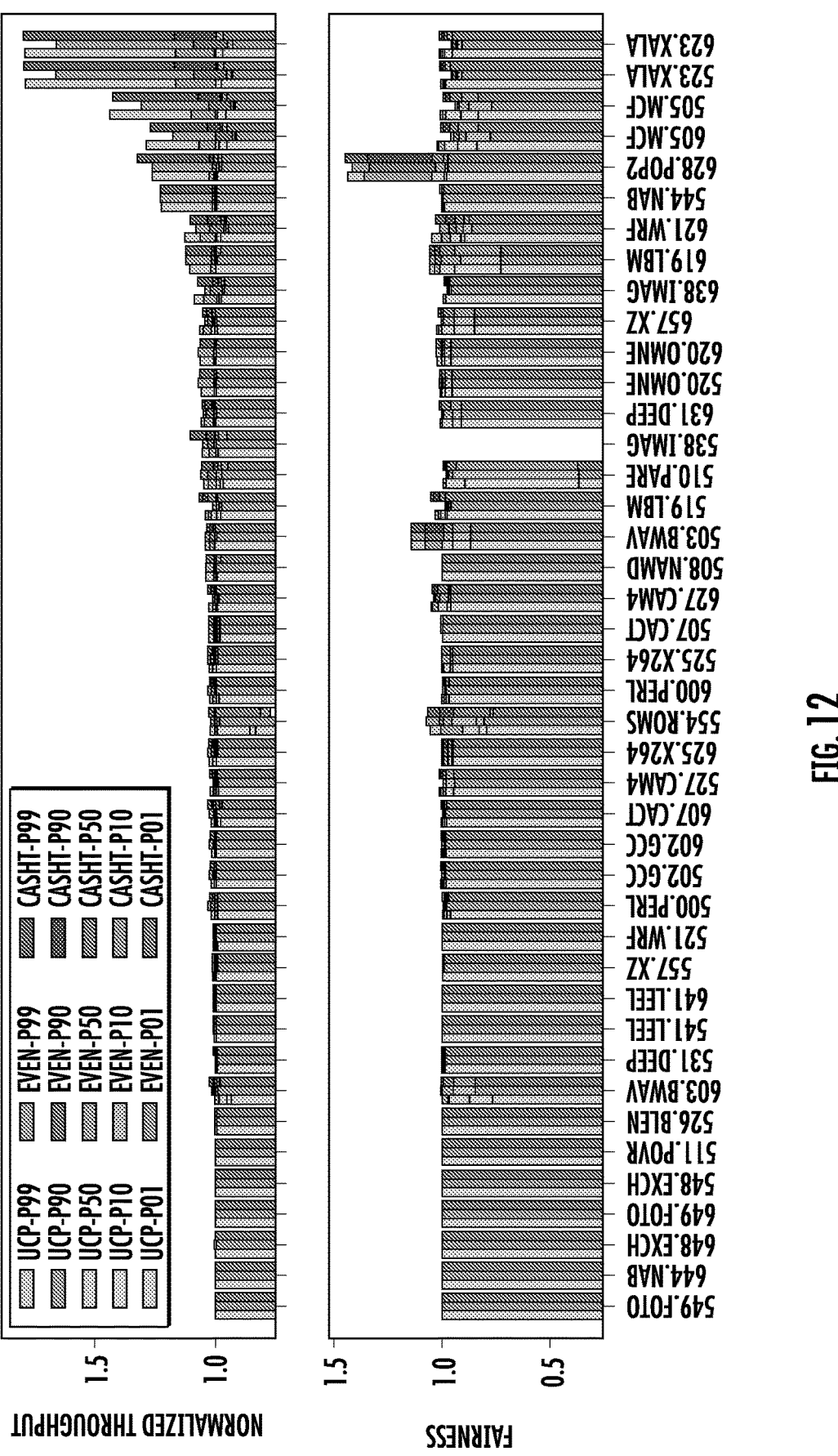
FIG. 12 is a pair of graphs comparing experimental results, in accordance with the present disclosure.

The performance impact each technique had on individual traces was analyzed relative to the percentiles for individual workload performance while sharing LLC. Percentiles (P) indicated a value, V in a data set for which N % of all values were less than V. FIG. 12 shows P=1%, P=10%, P=50%, P=90%, and P=99% of normalized throughput and fairness for each trace when in a shared cache. The x-axis shows benchmarks sorted by UCP p99 throughput values, the y-axis for the top reflects throughput (IPCcfg/IPCLRU), and y-axis for the bottom reflects fairness (IPCcfg/IPCIso). Each technique is distinguished by color density (light is UCP, medium is Even, dark is CASHT), and percentiles are distinguished by color families (p99=red, p90=green, p50-blue, p10-yellow, p01=gray) which are layered for compact representation of all percentiles per configuration.

In summary, this particular implementation of CASHT did not reach the peak performance of UCP but had a better lower percentile indicating less harm to the worst 1% of normalized throughput. UCP had a clear advantage for mcf- and xalancbmk-based traces (20-79% gains in normalized throughput over LRU). Additionally, UCP also had performance advantages for 621.wrf, 638.imagick, and 657.xz. CASHT had some advantage in 500.perlbench, 510.parest, 603.bwaves, 628.pop2, and 619.lbm, though some of the advantages can be attributed to evenly splitting the cache between traces given that Even Partitioning has similar or better solutions in most of these cases. On close inspection of the p10 and p01 values, CASHT can be observed to have had the advantage in minimizing harm for many LLC intense workloads (in bold in Table 3), indicating CASHT did less harm when LLC was more intensely in use. Add to this the fact that a >50% of traces had fairly similar results, and the attraction of a lighter technique is evident in those cases. Indeed, CASHT approached UCP peak performance and minimized harm to worst-case throughput at ⅛th the cost.

Figure 13:
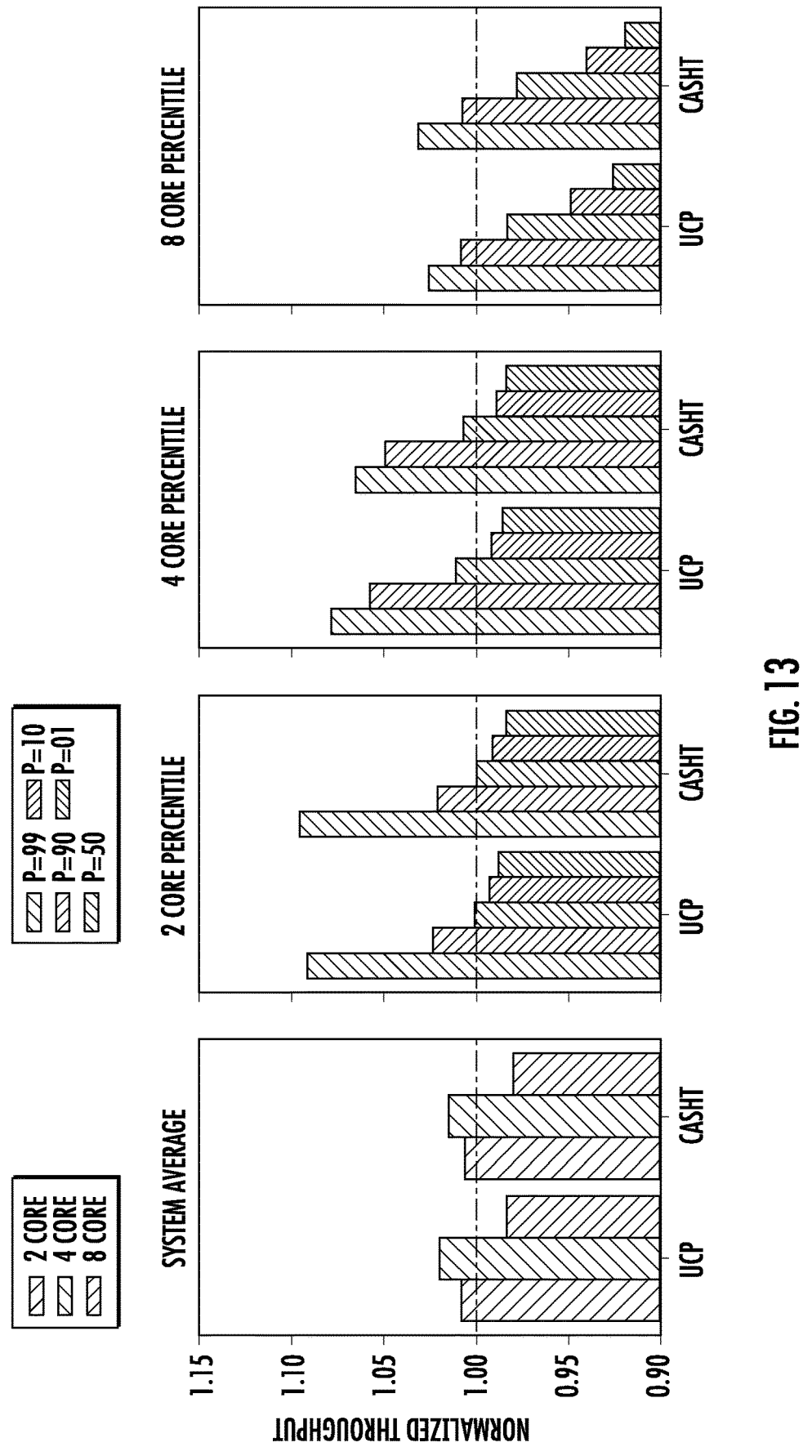
FIG. 13 is a pair of graphs comparing experimental results, in accordance with the present disclosure.

Analyzing average normalized throughput and fairness metrics for UCP and CASHT when scaled from 2 to 8 cores in FIG. 13, it is clear that this particular implementation of CASHT approached UCP performance in all metrics at each core configuration. The y-axis represents normalized throughput, while the x-axes show each partitioning configuration. Each plot reflects different presentations of average performance data from left to right: the first plot shows the average performance of the system; the second shows the performance metric percentile values from 99 to 1 at a 2 core configuration; the third shows the performance metric percentile values at a 4 core configuration; and the fourth shows similar percentile results but for the 8 core configuration. Percentiles indicate a value in a data set that exceeds the ascribed percentage of that data set (for example, p=10 throughput is greater than 10% of all throughput values in a common set of data).

UCP and CASHT have comparable average throughput, which can be seen from the first plot, with CASHT having the advantage due to being a fraction of the overhead of UCP. Further, the percentile plots (plots 2 through 4) support that the lightweight CASHT framework not only approached the heavyweight UCP implementation in the performance yielded per percentile, but also approached similar performance at a larger core count without the steep cost of scaling (aside from the additional hardware counters for thefts and interference that each core requires).

The techniques in Table 4 below show a range of applications and implementations of cache re-partitioning in recent literature.

TABLE 4

| | | | | | | | | |
|---|---|---|---|---|---|---|---|---|
| Last Level Cache Partitioning Framework Comparison (assumes 16 way, 4MB LLC; KEY: LA = lookahead; $ = cache; hw = hardware; sw = software; cyc = cycles; A = applications; C = core; T = thread; W = way; S = set; blk = block; umon = utility monitor; samp = sampler; mod = modify; pg = page; thrsh = threshold; allo = allocator; lat = latency; GBT = gradient boosting trees (section 4)) | | | | | | | | |
| framework | algorithm | C or T | partition | enforce | hw or sw | profile | repart. | overhead |
| UCP | LA | C | W | W-based | hw | samp | CVC | 3.7 kB/C |
| COLORIS | recolor engine | T | S | pg color | sw | $ umnon | thrsh | mod pg-alle |
| KPART | cluster + LA | T | W | W mask | sw | dynaway | cyc | $O(A^2W^2)$ lat |
| Cooperative | mod LA | C | W | W mask | hw | samp | cyc | 4.1 kB/C |
| ROCA | blk-migr. + LA | — | W | W mask | hw | samp | cyc | 82 kB |
| Gradient | hill climb | T | blk | statistical | hw | gradient set | always | 5B/T |
| MLC | Q-learn | T | W | W mask | hw | agent/T | cyc | 875B |
| CASHT | GBT + tree scale | C | W | W-based | hw | PSA | cyc | 16B/C + 1 kB |

To understand the implications, each can be compared across the following technique features: partition allocation algorithm; whether partitions are split between cores (C) or threads (T); what cache dimension (set or way) are caches partitioned; how partitions are enforced; if they are hardware (hw) or software (sw) based; how cache behavior is profiled; when repartitioning occurs; and the overhead. UCP tracks per workload cache hit curves to compute and balance the cache needs every 5M cycles. UCP introduced the lookahead algorithm to cache partitioning problem, and many works have adopted the algorithm as a foundation in their work, but UCP has large overhead and does not scale well as core counts scale up. COLORIS leverages page coloring via custom page allocator to partition cache along sets, but requires modifications to the operating system. Kpart exploits way partitioning adoption in silicon to partition last level cache into cluster groups, and uses IPC (plus miss rates and bandwidth) to cluster workloads before passing input to the lookahead algorithm. Kpart clusters applications to avoid the diminished returns of partitioning a few ways between many cores, which is not the goal of CASHT. Further, Kpart without clustering is similar to UCP adapted in software given that the lookahead algorithm is in use to determine partition sizes at each repartition step, so comparing against UCP can be sufficient.

Cooperative partitioning addresses orphaned lines and smooth the transitions after a re-partition step occurs, and modifies lookahead to allow for blocks to be disabled altogether. Reuse locality aware cache algorithm (ROCA) partitions between reused and not-reused cache blocks, leveraging a reuse predictor to determine partition placement at insertion. This differs from the approach taken by partitioning algorithms generally, but can be reduced to identifying blocks by prediction rather than CPU ID so most way-based can adapt to this problem. Gradient-based Cache Partitioning Algorithm (GPA) enables continuous partition adjustment at a cache block granularity by determining how the rate at which blocks are placed in cache in a protected (or vulnerable) state. Consequently, the usage of gradient sets can cause harm to a portion of cache due to purposeful beneficial and detrimental behavior across gradient sets, which CASHT avoids with PSA, as described above. Machine learned cache (MLC) partitions L2 AND L3 cache via a trained reinforcement learning model called Q-learning, enables smart and collaborative partitioning decisions between per thread Markov agents. Though MLC and CASHT both take advantage of learning algorithms, MLC partitions both L2 and L3 to achieve performance gain on a system that assumes Simultaneous Multi-Threading which CASHT does not.

In summary, theft-based metrics offer significant and complementary performance correlation, enables run-time contention analysis with the addition of 2 hardware counters per core or thread, and the theft mechanism allows estimation in the face of partitioning. Miss-based metrics which are often collected in isolation do require added overheads like a set sampler or run-time phases where application performance is harmed to collect them. Further, given that LLC misses (especially taken in isolation) are frequently reported as misleading, models based on such behavior render partial information and theft-based metrics can fill those gaps.

CASHT leverages theft-based metrics towards to address the cache partitioning problem by enabling run-time contention analysis and coupling the results with a supervised learning model to make partitioning predictions. Prior techniques partition along different cache dimensions (set or way) or employ different algorithms, but none consider cache contention directly. Additionally, the CASHT framework does not require the cache to operate in any harmful state for the sake of statistical analysis. Lastly, the CASHT framework approaches comparable performance to a technique with 8× the overhead for a 4 MB, 16 way LLC.

Thus, CASHT is provided as a contention analysis and re-partitioning framework that enables lightweight cache partitioning within performance noise margins of the well-regarded Utility-based Cache Partitioning at a fraction of the overhead. The GBT model was trained achieved 90% pseudo oracle prediction accuracy at 100B and 95+% accuracy at 1 k+B, and the Tree-Scaling algorithm allowed for scaling the solution above 2 core architectures. Contention estimation and lightweight sampling enabled by the ACE and PSA techniques allowed for keeping overhead small enough to be nominal in comparison to UCP. The 2-core results showed within the margin of noise (<0.5%) of UCP in both Throughput and Fairness metrics, and have room to grow in comparison to the static oracle performance the GBT model is trained on. Similarly, the 4-core results were are also within the margin of noise of UCP performance, affirming that the Tree-scaling algorithm is effective at scaling the 2-core solution up to 4-cores. As desired, one can re-train GBT on run-time oracle solutions rather than static solutions. It is contemplated to cluster workloads to reduce the number of partitions at core counts>2. So, the CASHT framework can be applied towards partition clustering and compare directly to KPart. One can also apply novel Tree-scaling optimizations that leverage the pseudo-oracle prediction for other cache management decisions, like changing the inclusion property for allocation predictions that indicate a workload operates best with the smallest allocation.

Figure 14:
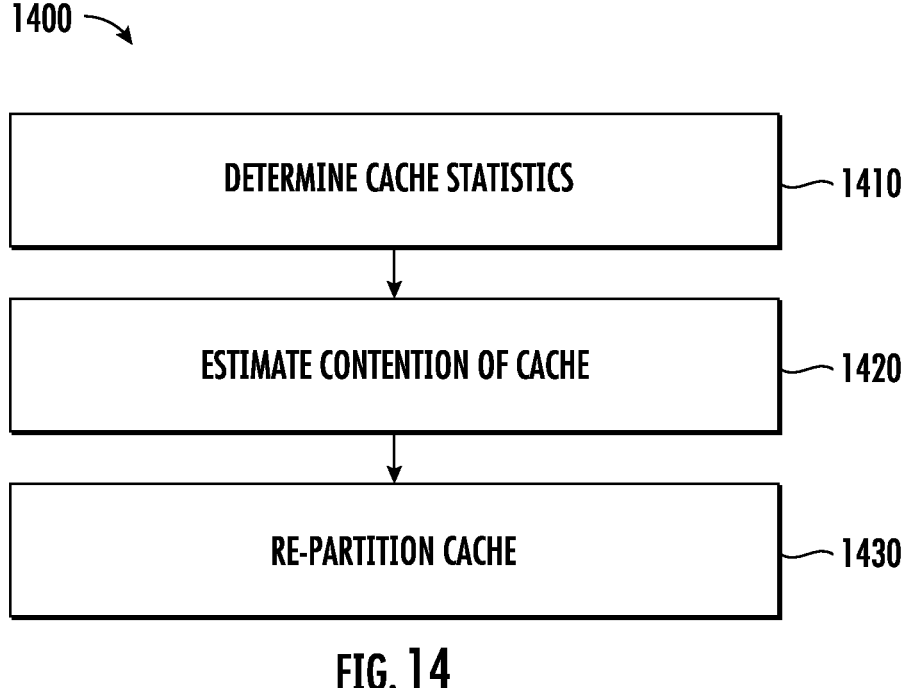
FIG. 14 is a flow diagram illustrating a process for managing a shared memory cache in a computing memory system, in accordance with the present disclosure.

FIG. 14 is a flow diagram showing a process 1400 process for managing a shared memory cache in a computing memory system. Process 1400 can be implemented using the approaches discussed above, including CASHT, PSA, and ACE. Process 1400 can generally be performed by a processor, such as a multi-core processor implemented as a microprocessor on a single integrated circuit with multiple separate processing units (cores), each of which executes instructions stored in memory. The multi-core processor can execute instructions using the separate cores at the same time, thereby increasing processing speed for programs and applications that support parallel computing techniques such as multithreading. As specific examples, process 1400 can be performed by re-partitioning systems 200 and 220 discussed above. It should be noted, however, that process 1400 can be performed by a variety of different types of processing systems and devices for different applications. Also, as discussed above, the approaches used to implement process 1400 can be scaled to processing systems and devices with a variety of numbers of processor cores, including 4 cores, 8 cores, etc.

Process 1400 is shown to include determining cache statistics (1410). The cache statistics can be associated with last level cache 202, for example. The cache statistics can be determined by probabilistically sampling last level cache 202, for example using probabilistically sampling access (PSA) module 204 and/or agnostic contention estimation (ACE) module 206. The cache statistics can include counting thefts and interferences, as discussed above, and the cache statistics can be tracked using core theft counters 210 and core interference counters 212. Core theft counters 210 and core interference counters 212 can be incremented each time the processor counts a theft and interference, respectively, during sampling of last level cache 202. As discussed above, thefts generally can be viewed as workload interactions in last level cache 202 that result in an eviction. For example, referring to example diagram 100 shown in FIG. 1, core 2 executes a theft 110 of resources from core 1, and core 1 experiences interference resulting from this theft. The cache statistics can be associated with one or more different processor cores, and can be stored in memory. The cache statistics can be determined by executing Algorithm 1 (i.e., native contention tracking (NCT) algorithm) as shown and discussed above, for example. The cache statistics can also include different and/or additional metrics, including those discussed above and generally known to the skilled person, including data associated with performance counters 208.

Process 1400 is also shown to include estimating contention of the cache (1420). The contention of the cache contention associated with last level cache 202, for example, and can be determined using probabilistically sampling access (PSA) module 204 and/or agnostic contention estimation (ACE) module 206. The estimation can be performed while some kind of cache partitioning for last level cache 202 is in place, regardless of what type of partitioning or other cache management policies may be in place. Estimating contention of last level cache 202 using the ACE framework as discussed above can provide lightweight approach to collection and sampling cache contention. The estimation of contention can be performed by executing Algorithm 2 (PSA+ACE) as discussed above, for example. The estimation of contention can include estimating the number of precented thefts associated with the memory cache, as well as a probability associated with the number of prevented thefts, as discussed above. The estimation of contention can be used to modify the cache statistics and/or can supplement the cache statistics, in order to generate a fuller picture of cache behavior. The contention of the cache can also be quantified using different and/or additional metrics, including those discussed above and generally known to the skilled person.

Process 1400 is also shown to include re-partitioning the cache (1430). For example, last level cache 202 can be re-portioned by a processor (e.g., memory controller 214 as discussed above) at a fixed re-partition interval, such as every five million cycles. The re-partitioning interval of 5 million cycles can provide various advantages, as discussed above. Tree scaling module 216, and the associated gradient boosting trees (GBT) machine learning model, can be used to predict one or more partition configurations used to re-partition the cache. The machine learning model can provide as output confidence values associated with one or more partition configurations. The machine learning model can take as input the cache statistics and the estimated contention of the cache, and generate corresponding predictions of cache configurations. The machine learning model can be trained using a training data set generated based on extracted features of a workload associated with the computing system (processor), as discussed above, in order to generate more accurate and dynamic predictions of cache configurations. The training data set can be generated at least in part based on historical the cache statistics and estimate cache contentions. By re-partitioning the cache in this manner, improved efficiencies in terms of data processing speed and efficiency, as well as reduced memory usage, can be achieved in various applications.

As used herein in the context of computer configuration, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Some aspects of the disclosure, including computerized configurations of methods according to the disclosure, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, claims of the disclosure can be implemented as a set of instructions, tangibly embodied on a non-transitory computer-readable media, such that a processor device can implement the instructions based upon reading the instructions from the computer-readable media. Some claims of the disclosure can include (or utilize) a control device such as an automation device, a special purpose or general-purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for configuration of appropriate functionality (e.g., memory, communication systems, power sources, user interfaces and other inputs, etc.).

Moreover, the present disclosure has described various aspects, and it should be appreciated that many equivalents, alternatives, variations, and modifications, aside from those expressly stated, are possible and within the scope of the invention.

The invention claimed is:

1. A method of managing a shared memory cache in a computing system, the method comprising:

determining cache statistics associated with the shared memory cache by probabilistically sampling the shared memory cache, the cache statistics comprising thefts and interferences associated with a plurality of cores of the computing system, the thefts comprising instances in which at least one block of the shared memory cache that is associated with one of the plurality of cores causes eviction of another block of the shared memory cache that is associated with another of the plurality of cores, the interferences comprising instances in which at least one block of the shared memory cache that is associated with one of the plurality of cores is evicted by another block of the shared memory cache that is associated with another of the plurality of cores;

estimating contention of the memory cache based on the cache statistics comprising the thefts and the interferences associated with the plurality of cores of the computing system; and re-partitioning the shared memory cache among the plurality of cores based on the cache statistics and the estimated contention.

2. The method of claim 1, wherein re-partitioning the shared memory cache comprises:

predicting at least one partition configuration via a machine learning model; and selecting a partition configuration from the at least one partition configuration, based on corresponding confidence values provided as output by the machine learning model;

wherein re-partitioning the shared memory cache among the plurality of cores is based on the selected partition configuration.

3. The method of claim 2, further comprising:

generating a training data set based on extracted features of a workload associated with the computing system; and training the machine learning model using the training data set.

4. The method of claim 3, wherein generating the training data set based on the extracted features of the workload associated with the computing system comprises generating the training data set based on the cache statistics and the estimated contention.

5. The method of claim 4, wherein the machine learning model comprises a gradient boosting trees model.

6. The method of claim 1, wherein estimating the contention of the shared memory cache comprises estimating a number of prevented thefts associated with the shared memory cache.

7. The method of claim 1, wherein re-partitioning the shared memory cache comprises re-partitioning the shared memory cache at a fixed re-partition interval.

8. The method of claim 7, wherein re-partitioning the shared memory cache comprises re-partitioning the shared memory cache at the fixed re-partition interval of five million cycles.

9. A computing system comprising:

a partitioned memory cache that is shared among and in communication with a plurality of cores; and a processor comprising the plurality of cores and configured to:

determine cache statistics by probabilistically sampling the partitioned memory cache, the cache statistics comprising thefts and interferences associated with the plurality of cores, the thefts comprising instances in which at least one block of the partitioned memory cache that is associated with one of the plurality of cores causes eviction of another block of the partitioned memory cache that is associated with another of the plurality of cores, the interferences comprising instances in which at least one block of the partitioned memory cache that is associated with one of the plurality of cores is evicted by another block of the partitioned memory cache that is associated with another of the plurality of cores;

estimate contention of the partitioned memory cache based on the cache statistics comprising the thefts and the interferences associated with the plurality of cores; and re-partition the partitioned memory cache among the plurality of cores, based on the cache statistics and the estimated contention.

10. The system of claim 9, wherein the processor is configured to estimate the contention of the partitioned memory cache by estimating a number of prevented thefts associated with the partitioned memory cache.

11. The system of claim 9, wherein the processor is configured to re-partition the partitioned memory cache among the plurality of cores at a fixed re-partition interval.

12. The system of claim 11, wherein the processor is configured to re-partition the partitioned memory cache among the plurality of cores at the fixed re-partition interval of five million cycles.

13. The system of claim 9, wherein the processor is configured to re-partition the partitioned memory cache among the plurality of cores by:

predicting at least one partition configuration via a machine learning model; and selecting a partition configuration from the at least one partition configuration, based on corresponding confidence values provided as output by the machine learning model.

14. The system of claim 13, wherein the processor is further configured to:

generate a training data set based on extracted features of a workload associated with the processor; and train the machine learning model using the training data set.

15. The system of claim 14, wherein the processor is configured to generate the training data set based on the cache statistics and the estimated contention.

16. The system of claim 15, wherein the machine learning model comprises a gradient boosting trees model.

17. A non-transitory computer-readable storage medium having instructions stored thereon that, when executed by a processor, cause the processor to:

determine cache statistics associated with a memory cache by probabilistically sampling the memory cache, the memory cache in communication with and shared among a plurality of cores of the processor, the cache statistics comprising thefts and interferences associated with the plurality of cores, the thefts comprising instances in which at least one block of the memory cache that is associated with one of the plurality of cores causes eviction of another block of the memory cache that is associated with another of the plurality of cores, the interferences comprising instances in which at least one block of the memory cache that is associated with one of the plurality of cores is evicted by another block of the memory cache that is associated with another of the plurality of cores;

estimate contention of the memory cache based on the cache statistics comprising the thefts and the interferences associated with the plurality of cores; and re-partition the memory cache among the plurality of cores based on the cache statistics and the estimated contention.

18. The computer-readable medium of claim 17, wherein the instructions, when executed by the processor, cause the processor to re-partition the memory cache among the plurality of cores by:

applying the cache statistics as input to a machine learning model; and identifying a partition configuration for the memory cache based on an output provided by the machine learning model responsive to receiving the cache statistics as input;

wherein the instructions, when executed by the processor, cause the processor to re-partition the memory cache among the plurality of cores based on the identified partition configuration.

19. The computer-readable medium of claim 18, wherein the machine learning model comprises a pre-trained gradient boosting trees model.

20. The computer-readable medium of claim 17, wherein the instructions, when executed by the processor, cause the processor to estimate the contention of the memory cache by estimating a number of prevented thefts associated with the memory cache.

\* \* \* \* \*